(12) United States Patent
Lee et al.

(10) Patent No.: US 12,374,710 B2
(45) Date of Patent: Jul. 29, 2025

(54) BATTERY

(71) Applicant: Standard Energy Inc., Daejeon (KR)

(72) Inventors: Dongyoung Lee, Daejeon (KR); Bugi Kim, Daejeon (KR)

(73) Assignee: Standard Energy Inc., Daejeon (KR)

( * ) Notice: Subject to any disclaimer, the term of this patent is extended or adjusted under 35 U.S.C. 154(b) by 0 days.

(21) Appl. No.: 18/215,622

(22) Filed: Jun. 28, 2023

(65) Prior Publication Data

US 2023/0420719 A1  Dec. 28, 2023

(30) Foreign Application Priority Data

Jun. 28, 2022  (KR) .......................... 1020220078818

(51) Int. Cl.
| | | |
|---|---|---|
| *H01M 8/18* | (2006.01) | |
| *H01M 8/0247* | (2016.01) | |
| *H01M 8/0273* | (2016.01) | |
| *H01M 8/0289* | (2016.01) | |

(52) U.S. Cl.
CPC ......... *H01M 8/188* (2013.01); *H01M 8/0247* (2013.01); *H01M 8/0273* (2013.01); *H01M 8/0289* (2013.01)

(58) Field of Classification Search
CPC .. H01M 8/188; H01M 8/0247; H01M 8/0273; H01M 8/0289
USPC ....................................................... 429/105
See application file for complete search history.

(56) References Cited

U.S. PATENT DOCUMENTS

| | | |
|---|---|---|
| 6,475,661 B1 | 11/2002 | Pellegri et al. |
| 9,947,944 B2 | 4/2018 | Kanno et al. |
| 11,387,479 B2 | 7/2022 | Brett et al. |
| 2005/0234742 A1 | 10/2005 | Hodgdon |
| 2011/0223450 A1 | 9/2011 | Horne et al. |
| 2011/0274948 A1 | 11/2011 | Duduta et al. |
| 2011/0300417 A1 | 12/2011 | Mou et al. |
| 2012/0164499 A1 | 6/2012 | Chiang et al. |
| 2012/0321986 A1 | 12/2012 | Mekala et al. |

(Continued)

FOREIGN PATENT DOCUMENTS

| | | |
|---|---|---|
| CN | 109037725 | 12/2018 |
| CN | 112615029 | 4/2021 |

(Continued)

OTHER PUBLICATIONS

International Search Report and Written Opinion in International Appln. No. PCT/KR2022/009224, mailed on Mar. 22, 2023, 14 pages (with machine English translation).

*Primary Examiner* — Christian Roldan
(74) *Attorney, Agent, or Firm* — Fish & Richardson P.C.

(57) ABSTRACT

A battery according to some implementations includes a first liquid electrode to undergo a first half reaction, a second liquid electrode to undergo a second half reaction, a hollow frame forming a first electrode reservoir to store the first liquid electrode and a second electrode reservoir to store the second liquid electrode, and a separating membrane coupled to the frame and disposed between the first electrode reservoir and the second electrode reservoir, wherein the frame includes an inter-electrode communication part configured to allow the first electrode reservoir and the second electrode reservoir to be in fluidic communication with each other.

22 Claims, 21 Drawing Sheets

(56) References Cited

U.S. PATENT DOCUMENTS

| | | |
|---|---|---|
| 2013/0011704 A1* | 1/2013 | Horne ............... H01M 8/20 |
| | | 320/128 |
| 2016/0006054 A1 | 1/2016 | Li et al. |
| 2017/0263951 A1 | 9/2017 | Kanno et al. |
| 2018/0108893 A1* | 4/2018 | Yang ............. H01M 10/4235 |
| 2018/0277858 A1 | 9/2018 | Fujita et al. |
| 2018/0342326 A1 | 11/2018 | Moturu et al. |
| 2018/0366736 A1 | 12/2018 | Ichikawa et al. |
| 2019/0355998 A1 | 11/2019 | Chiang et al. |
| 2020/0051697 A1 | 2/2020 | Krishnamurti et al. |
| 2021/0175532 A1* | 6/2021 | Lee ..................... H01M 4/94 |
| 2022/0173422 A1 | 6/2022 | Kucernak et al. |
| 2024/0222656 A1 | 7/2024 | Lee et al. |
| 2024/0222662 A1 | 7/2024 | Lee et al. |
| 2024/0396057 A1 | 11/2024 | Lee et al. |

FOREIGN PATENT DOCUMENTS

| | | |
|---|---|---|
| JP | S 63298977 | 12/1988 |
| JP | 2002237323 | 8/2002 |
| JP | 2014-130778 | 7/2014 |
| JP | 2015-095374 | 5/2015 |
| JP | 2015-115242 | 6/2015 |
| KR | 10-1027472 B1 | 4/2011 |
| KR | 10-2013-0098339 A | 9/2013 |
| KR | 101367625 | 2/2014 |
| KR | 10-1431070 | 8/2014 |
| KR | 10 2015 0100040 | 9/2015 |
| KR | 1020160059974 | 5/2016 |
| KR | 10-2016-0055489 | 3/2017 |
| KR | 10 2017 0025153 | 3/2017 |
| KR | 10 2017 0034995 | 3/2017 |
| KR | 10-1715915 | 3/2017 |
| KR | 10-2017-0120820 | 11/2017 |
| KR | 10 2017 0137602 | 12/2017 |
| KR | 10 2018 0023750 | 3/2018 |
| KR | 10-2018-0040473 A | 4/2018 |
| KR | 10-2019-0102816 | 9/2019 |
| KR | 10 2021607 | 9/2019 |
| KR | 1020220096913 | 7/2022 |
| WO | WO 2021/118913 | 6/2021 |

\* cited by examiner

BATTERY

CROSS-REFERENCE TO RELATED APPLICATION

This application claims priority to and the benefit of Korean Patent Application No. 10-2022-0078818, filed on 2022 Jun. 28, the disclosure of which is incorporated herein by reference in its entirety.

TECHNICAL FIELD

Disclosed herein is a battery, and in particular, a battery in which a metal ion dissolved in an electrolyte is oxidized and reduced to charge or discharge the battery.

BACKGROUND

Redox flow batteries (RFB) have a mechanism in which active materials in electrolytes are oxidized and reduced to charge or discharge the batteries, and belong to an electrochemical storage device which stores electric energy as chemical energy of electrolytes. In terms of a redox flow battery, an electrochemical reaction undergoes actually in a stack, and electrolytes continue to circulate in the stack, with a fluid pump, to operate the battery.

SUMMARY

Technical Problems

An objective of the present disclosure is to provide a battery in which an imbalance of liquid electrodes, caused by the crossover phenomenon, is resolved.

Another objective of the present disclosure is also to provide a battery that helps to prevent a short circuit and the crossover phenomenon.

Aspects according to the present disclosure are not limited to the above ones, and other aspects and advantages that are not mentioned above can be clearly understood by one having ordinary skill in the art, based on the following description.

Technical Solutions

A battery according to some implementations of the present disclosure includes a first liquid electrode to undergo a first half reaction, a second liquid electrode to undergo a second half reaction, a hollow frame forming a first electrode reservoir to store the first liquid electrode and a second electrode reservoir to store the second liquid electrode, a separating membrane coupled to the frame and disposed between the first electrode reservoir and the second electrode reservoir, and the frame includes an inter-electrode communication part configured to allow the first electrode reservoir and the second electrode reservoir to be in fluidic communication with each other.

The frame can be formed into a hollow rectangle shape, and a portion of the inter-electrode communication part can be disposed along at least a portion of the frame.

The frame can include a separating membrane support part protruding inward and being coupled to the separating membrane, and the inter-electrode communication part can be disposed outside the separating membrane support part.

The battery can further include a first current collector coupled to the frame at the first electrode reservoir side of the frame (the side of the frame accommodating the first electrode reservoir) and electrically connecting to the first liquid electrode. A first gasket sealing can be disposed between the first current collector and the frame, where the frame can include a first gasket insertion part into which the first gasket is inserted, and the inter-electrode communication part can be disposed inside the first gasket insertion part.

The battery can further include a first current collector coupled to the frame at the first electrode reservoir side of the frame (the side of the frame accommodating the first electrode reservoir) and electrically connecting to the first liquid electrode. A first insulator can be attached to the frame to prevent the first liquid electrode or the second liquid electrode that flows through the inter-electrode communication part from contacting the first current collector.

The first insulator can seal between the first current collector and the frame.

The first insulator can be stacked between the first current collector and the frame.

The first insulator can be a film applied onto the first current collector.

The inter-electrode communication part can include at least two bent portions.

The inter-electrode communication part can bend from an in-plane direction to an out-of-plane direction or from an out-of-plane direction to an in-plane direction.

The inter-electrode communication part can pass through an extended plane that is co-planar to the separating membrane.

The inter-electrode communication part can be orthogonal to the extended plane that is co-planar to the separating membrane.

A portion of the inter-electrode communication part can be disposed in a direction parallel with a direction of an extended plane that is co-planar to the separating membrane.

The battery can further include a first solid electrode disposed in the first electrode reservoir and configured to be impregnated with the first liquid electrode, and a second solid electrode disposed in the second electrode reservoir and configured to be impregnated with the second liquid electrode, and the inter-electrode communication part may be disposed at a part of a perimeter of the first solid electrode or the second solid electrode.

The battery can further include a first solid electrode disposed in the first electrode reservoir and configured to be impregnated with the first liquid electrode, and a second solid electrode disposed in the second electrode reservoir and configured to be impregnated with the second liquid electrode, and the inter-electrode communication part can be disposed around an entire perimeter of the first solid electrode or the second solid electrode.

At least two parts of the inter-electrode communication part can be disposed side by side.

The battery can further include a liquid electrode injection part for injecting the first liquid electrode and the second liquid electrode into the first electrode reservoir and the second electrode reservoir, and the liquid electrode injection part can be in fluidic communication with the inter-electrode communication part.

The first liquid electrode and the second liquid electrode can be injected into the first electrode reservoir and the second electrode reservoir though the liquid electrode injection part.

A width of a cross section of the inter-electrode communication part can be less than half of a thickness of the frame.

The frame can have a hollow rectangle shape with four side portions, and an entire length of the inter-electrode communication part can be greater than a length of a longer side portion of the frame.

A battery according to some implementations of the present disclosure includes a first liquid electrode to undergo a first half reaction, a second liquid electrode to undergo a second half reaction, a separating membrane disposed between the first liquid electrode and the second liquid electrode, and a frame to support the separating membrane, and the frame includes an inter-electrode communication part through which the first liquid electrode and/or the second liquid electrode flow.

A battery according to some implementations of the present disclosure includes a first current collector, a second current collector spaced apart from the first current collector, a separating membrane disposed between the first current collector and the second current collector, a first liquid electrode disposed between the first current collector and the separating membrane to undergo a first half reaction, and connects to the first current collector electrically, a second liquid electrode disposed between the second current collector and the separating membrane to undergo a second half reaction, and connects to the second current collector electrically, and a hollow frame disposed between the first current collector and the second current collector, and the frame includes an inter-electrode communication part through which the first liquid electrode and/or the second liquid electrode flow.

A battery according to some implementations of the present disclosure can include a first current collector, a second current collector spaced apart from the first current collector, a separating membrane disposed between the first current collector and the second current collector, and a frame disposed between the first current collector and the second current collector, and forming a first electrode reservoir between the first current collector and the separating membrane and forming a second electrode reservoir between the second current collector and the separating membrane, and the frame includes an inter-electrode communication part allowing the first electrode reservoir and the second electrode reservoir to be in fluidic communication with each other.

A battery according to some implementations of the present disclosure includes a first current collector, a second current collector spaced from the first current collector, a separating membrane disposed between the first current collector and the second current collector, and a frame disposed between the first current collector and the second current collector, and forming a first electrode reservoir between the first current collector and the separating membrane and forming a second electrode reservoir between the second current collector and the separating membrane, and the frame includes a separating membrane support part protruding inward in the in-plane direction and supporting the separating membrane.

Details of other implementations are provided, hereafter, in the detailed description and drawings.

Advantageous Effects

A battery according to implementations of the present disclosure can have one or more of the following effects.

First, the battery can help ensure the prevention of deterioration in its performance and ensure a reduction in its lifespan, while helping to resolve an imbalance of liquid electrodes, caused by the crossover phenomenon, and ensuring high power and high capacity as a redox battery.

Second, the battery can help prevent a short circuit between a first liquid electrode and a second liquid electrode while resolving an imbalance between the liquid electrodes.

Third, in the battery, a separating membrane can be supported while a frame helps to reduce the possibility of the leakage of the liquid electrodes.

Fourth, in the battery, damage to a current collector, caused by the liquid electrodes, can be prevented since an insulator is disposed between an inter-electrode communication part and the current collector.

Fifth, in the battery, a separating membrane support part can suppress the deformation of the frame, caused by the swell or shrink of the liquid electrodes, the generation of gas in the liquid electrodes, or an external impact and the like.

Advantages of implementations described in the present disclosure are not limited to the advantages described above, and other advantages that are not mentioned above can be clearly understood by one having ordinary skill in the art, based on the claims.

BRIEF DESCRIPTION OF DRAWINGS

The accompanying drawings constitute a part of the specification, illustrate one or more implementations in the disclosure, and together with the specification, explain the disclosure, wherein.

DETAILED DESCRIPTION

Figure 1:
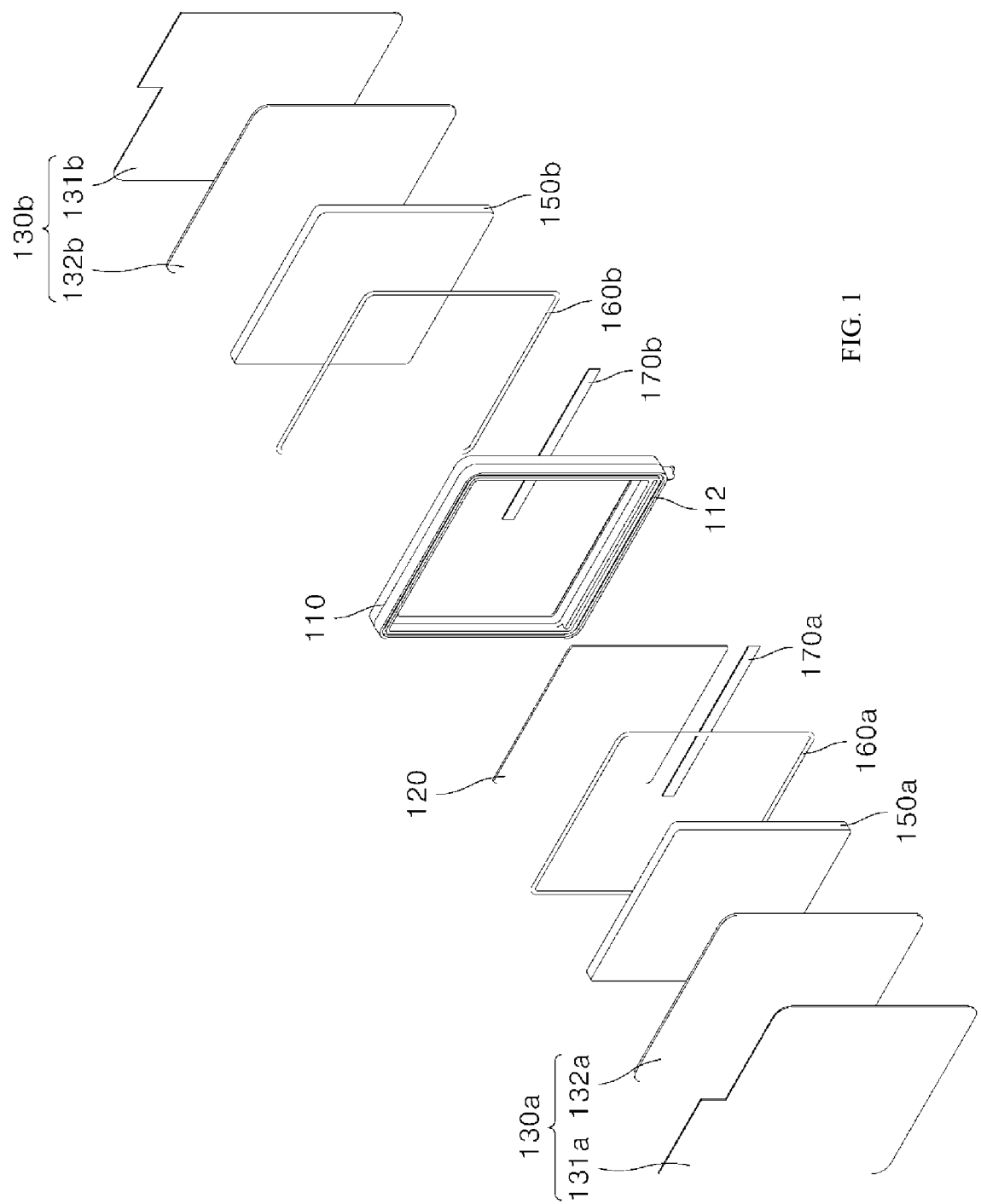
FIGS. 1 and 2 are exploded perspective views showing a battery of one implementation.

A redox flow battery has advantages such as a long lifespan, high power and high capacity. However, an external tank for storing electrolytes and a fluid pump for allowing the electrolytes to flow can cause space limitations of a battery and a difficulty in designing a battery. Implementations are disclosed herein for a redox battery from which an electrolyte tank and a fluid pump are removed. As such, unlike a redox flow battery, implementations of the present disclosure enable the electrolytes to be maintained only in the two half-cells of the battery without the need for separate external tanks, thereby reducing space requirements and simplifying design.

However, a problem remains where a crossover phenomenon is caused by metal ions and water that pass through a separating membrane between the two half-cells of the battery at a time of charge or discharge. This crossover phenomenon can result in an imbalance of the electrolytes in the two half-cells, deterioration in the performance of the battery, and a reduction in the lifespan of the battery. According to implementations of the present disclosure, an inter-electrode communication part enables the liquid electrolytes in the two half-cells to be in fluidic communication with each other and thereby re-balance the amounts of electrolytes in the two half-cells, while also preventing risk of electrical short circuits that could be caused by mixing of the two electrolytes.

Advantages and features in the present disclosure and methods for ensuring the same can be clearly understood from the implementations that are described hereafter with reference to the accompanying drawings. The subject matter of the present disclosure, however, can be implemented in various different forms, and should not be construed as being limited to the implementations set forth herein. Rather, the implementations are provided as examples so that the present disclosure can be thorough and complete and that the scope of the disclosure can be fully conveyed to one having ordinary skill in the art. The subject matter of the present disclosure is to be defined only according to the scope of the appended claims. Throughout the disclosure, identical reference numerals can denote identical or similar components.

The terms "first", "second" and the like are used herein only to distinguish one component from another component. Thus, the components should not be limited by the terms. Certainly, a first component can be a second component, unless stated to the contrary.

Throughout the disclosure, each component can be provided as a single one or a plurality of ones, unless explicitly stated to the contrary.

When any one component is described as being "in the upper portion (or lower potion)" or "on (or under)" another component, any one component can be directly on (or under) another component, but an additional component can be interposed between any one component and another component on (or under) any one component.

When any one component is described as being "connected", "coupled", or "connected" to another component, any one component can be directly connected or coupled to another component, but an additional component can be "interposed" between the two components or the two components can be "connected", "coupled", or "connected" by an additional component.

The singular forms "a", "an" and "the" are intended to include the plural forms as well, unless explicitly indicated otherwise. It should be further understood that terms such as "include" and the like, set forth herein, are not interpreted as necessarily including all the stated components or steps but can be interpreted as excluding some of the stated components or steps or can be interpreted as including additional components or steps.

Throughout the disclosure, the phrase "A and/or B" as used herein can denote A, B or A and B, and the phrase "C to D" can denote C or greater and D or less, unless stated to the contrary.

Hereafter, a battery according to the present disclosure is described with reference to the implementations and drawings.

Figure 2:
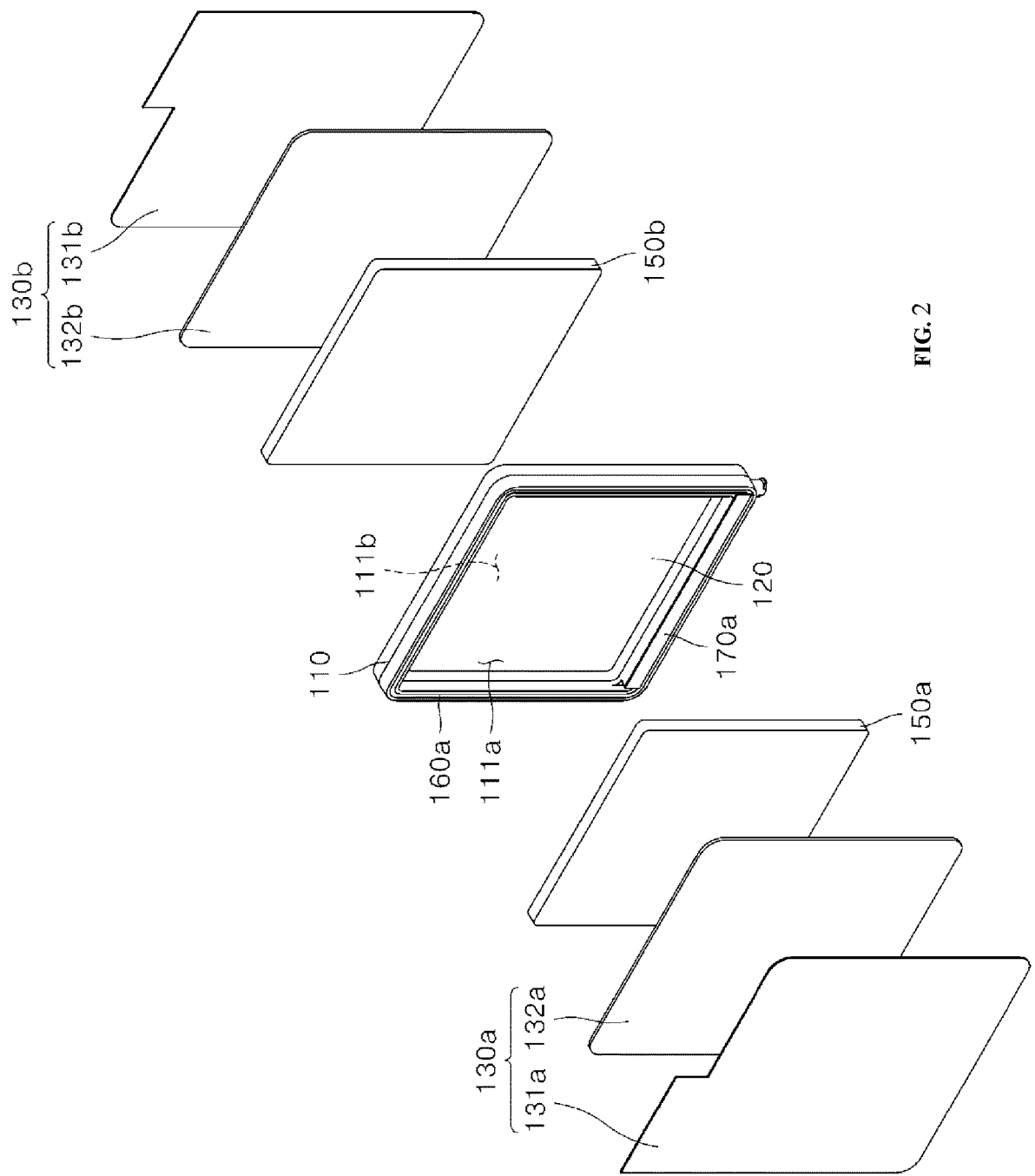
Figure 3:
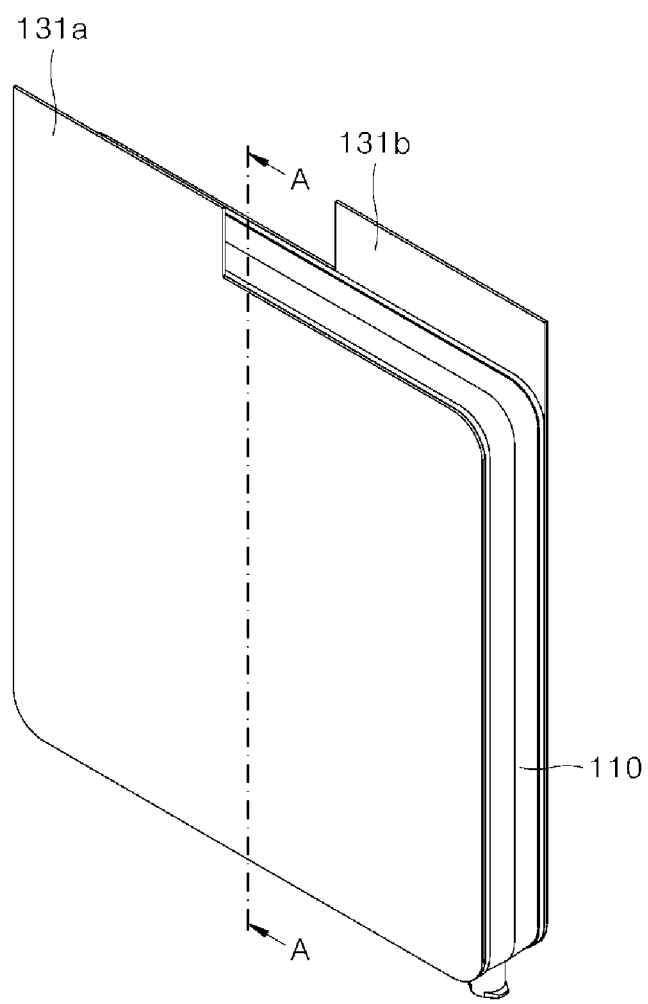
FIG. 3 is a perspective view showing the battery of one implementation.
Figure 4:
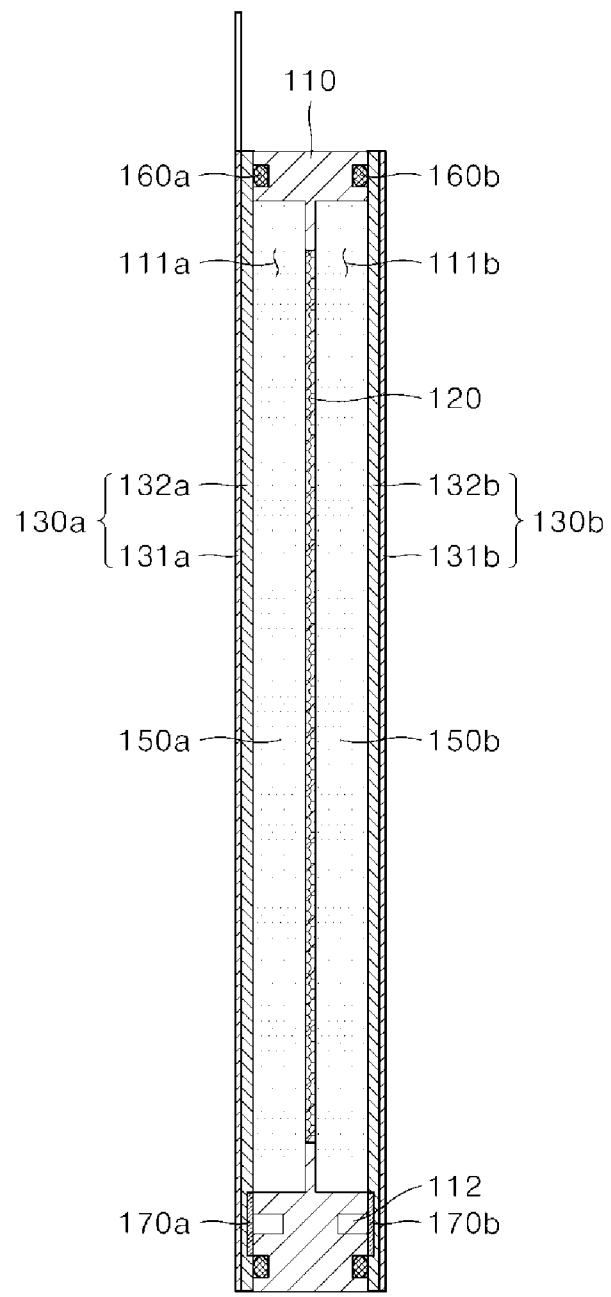
FIG. 4 is a cross-sectional view showing the battery along A-A in FIG. 3.
Figure 5:
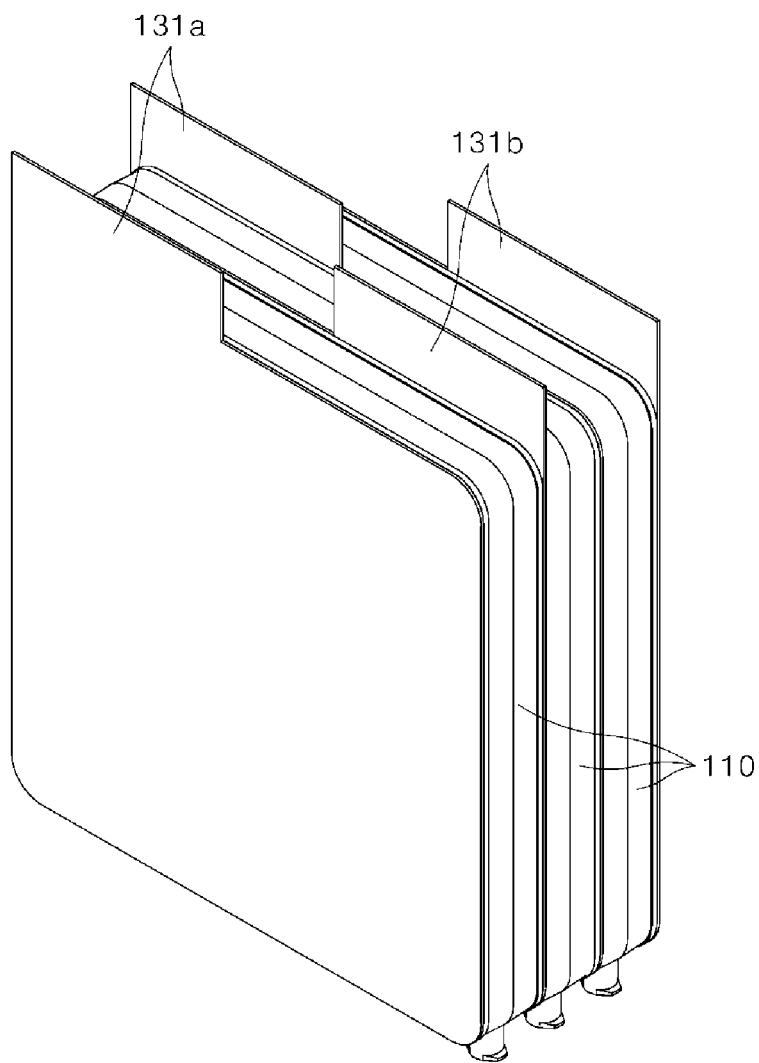
FIG. 5 is a perspective view showing a battery module of one implementation.

FIGS. 1 and 2 are exploded perspective views showing a battery of one implementation, FIG. 3 is a perspective view showing the battery of one implementation, FIG. 4 is a cross-sectional view showing the battery along A-A in FIG. 3, and FIG. 5 is a perspective view showing a battery module of one implementation.

The battery of one implementation includes a first liquid electrode at which a first half reaction undergoes, a second liquid electrode at which a second half reaction undergoes. In some implementations, the battery includes a frame 110 for a first electrode reservoir 111a that is a space in which the first liquid electrode is stored and a second electrode reservoir 111b that is a space in which the second liquid electrode is stored. The frame 110 can have a hollow opening, and a separating membrane 120 is coupled to the frame 110 and is disposed in the hollow opening of the frame 110 between the first electrode reservoir 111a and the second electrode reservoir 111b.

The battery also includes a first current collector 130a coupled to the first electrode reservoir 111a side of the frame 110 (the side of the frame accommodating the first electrode reservoir 111a) and electrically connecting to the first liquid electrode, a second current collector 130b coupled to the second electrode reservoir 111b side of the frame 110 (the side of the frame accommodating the second electrode reservoir 111b) and electrically connecting to the second liquid electrode, a first solid electrode 150a disposed in the first electrode reservoir 111a and impregnated with the first liquid electrode, a second solid electrode 150b disposed in the second electrode reservoir 111b and impregnated with the second liquid electrode, a first insulator 170a attached between the frame 110 and the first current collector 130a, and a second insulator 170b attached between the frame 110 and the second current collector 130b.

The first liquid electrode is an electrolyte where an anode redox couple is dissolved. The anode redox couple may be made of a material including at least one of vanadium (V), zinc (Zn), bromine (Br), chromium (Cr), manganese (Mn), titanium (Ti), iron (Fe), cerium (Ce) and cobalt (Co). In the implementation, a $V^{2+}/V^{3+}$ redox couple is provided. The first liquid electrode may be an acidic solution that conducts current, based on ionization, and preferably include sulfuric acid. In the implementation, the first liquid electrode may be manufactured in a way that vanadylsulfate ($VOSO_4$) or vanadium pentoxide ($V_2O_5$) is dissolved in a sulfuric acid ($H_2SO_4$) solution.

The first liquid electrode brings about the first half reaction. The first half reaction is described as follows. The arrow→indicates the direction of a discharge reaction, and the arrow←indicates the direction of a charge reaction.

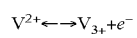

At a time of discharge, vanadium (2+) ions are oxidized to vanadium (3+) ions, and at a time of charge, vanadium (3+) ions are reduced to vanadium (2+) ions.

The first liquid electrode is surrounded by a combination of the frame 110, the first current collector 130a, and the separating membrane 120. In some implementations, the frame 110 can provide structural support between the first current collector 130a and the separating membrane 120, and also can prevent the first liquid electrode from leaking in the in-plane direction. The first liquid electrode is accommodated in the first electrode reservoir 111a. Preferably, the first solid electrode 150a is impregnated with the first liquid electrode.

The first liquid electrode electrically connects with the first current collector 130a, and electrons of the first liquid electrode move to the first current collector 130a at a time of discharge, while electrons of the first current collector 130a move to the first liquid electrode at a time of charge. The first liquid electrode contacts the separating membrane 120, and through the separating membrane 120, a positively charged hydrogen ion (a proton) moves.

The second liquid electrode is an electrolyte where a cathode redox couple is dissolved. The cathode redox couple may be made of a material including at least one of vanadium (V), zinc (Zn), bromine (Br), chromium (Cr), manganese (Mn), titanium (Ti), iron (Fe), cerium (Ce) and cobalt (Co). In the implementation, a $V^{4+}/V^{5+}$ redox couple is provided. The second liquid electrode may be an acidic solution that conducts current, based on ionization, and preferably include sulfuric acid. In the implementation, the second liquid electrode may be manufactured in a way that vanadylsulfate ($VOSO_4$) or vanadium pentoxide ($V_2O_5$) is dissolved in a sulfuric acid ($H_2SO_4$) solution.

The second liquid electrode brings about the second half reaction. The second half reaction is described as follows. The arrow→indicates the direction of a discharge reaction, and the arrow←indicates the direction of a charge reaction.

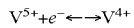

$$V^{5+}+e^- \leftarrow \rightarrow V^{4+}$$

At a time of discharge, vanadium (5+) ions are reduced to vanadium (4+) ions, and at a time of charge, vanadium (4+) ions are oxidized to vanadium (5+) ions.

The second liquid electrode is surrounded by a combination of the frame 110, the second current collector 130b, and the separating membrane 120. In some implementations, the frame 110 can provide structural support between the second current collector 130b and the separating membrane 120, and also can prevent the second liquid electrode from leaking in the in-plane direction. The second liquid electrode is accommodated in the second electrode reservoir 111b. Preferably, the second solid electrode 150b is impregnated with the second liquid electrode.

The second liquid electrode electrically connects with the second current collector 130b, and electrons of the second liquid electrode move to the second current collector 130b at a time of charge, while electrons of the second current collector 130b move to the second liquid electrode at a time of discharge. The second liquid electrode contacts the separating membrane 120, and through the separating membrane 120, a positively charged hydrogen ion (a proton) moves.

As described in the implementations above, the first liquid electrode and the second liquid electrode are made of the same material. The first liquid electrode and the second liquid electrode are electrodes where vanadium ions are included in an electrolyte of the same material. Hereafter, the first liquid electrode and the second liquid electrode are collectively referred to as a liquid electrode.

The frame 110 described in the examples above is formed into a rectangle having a hollow opening. Depending on implementations, alternatively, the frame 110 may be formed into a circle or a polygon such as a rhombus, a triangle or a pentagon and the like. The frame 110 can have a thickness in the out-of-plane direction and forms the first electrode reservoir 111a and the second electrode reservoir 111b.

The space of the hollow opening of the frame 110 can be divided into the first electrode reservoir 111a and the second electrode reservoir 111b by the separating membrane 120. In some implementations, the separating membrane 120 can be coupled to the center of the frame 110 in the out-of-plane direction (the thickness direction). The frame 110 provides structural support for the separating membrane 120.

The first current collector 130a is disposed at one side of the frame 110 (e.g., the side of the frame accommodating the first electrode reservoir 111a) in the out-of-plane direction, and the second current collector 130b is disposed at the other side of the frame 110 (e.g., the other side of the frame accommodating the second electrode reservoir 111b) in the out-of-plane direction. As such, the hollow opening of the frame 110 is closed on both sides by the first current collector 130a and the second current collector 130b. The frame 110 disposed between the first current collector 130a and the second current collector 130b prevents the first liquid electrode and the second liquid electrode from leaking in the in-plane direction and the like. In the frame 110, the first electrode reservoir 111a is formed between the first current collector 130a and the separating membrane 120, and the second electrode reservoir 111b is formed between the second current collector 130b and the separating membrane 120.

The frame 110 accommodates the first liquid electrode and the second liquid electrode. For example, the first liquid electrode and the second liquid electrode are impregnated into the first solid electrode 150a and the second solid electrode 150b, respectively, which are disposed in the frame 110. A first gasket 160a is coupled to one side of the frame 110 (e.g., the side of the frame facing the first current collector 130a), and a second gasket 160b is coupled to the other side of the frame 110 (e.g., the other side of the frame facing the second current collector 130b). The first insulator 170a is attached to one side of the frame 110 (e.g., the side of the frame facing the first current collector 130a), and the second insulator 170b is attached to the other side of the frame 110 (e.g., the other side of the frame facing the second current collector 130b).

The separating membrane 120 is disposed in the frame 110, separates the first liquid electrode and the second liquid electrode, and allows a positively charged hydrogen ion (a proton) to move between the first liquid electrode and the second liquid electrode. The separating membrane 120 is disposed between the first current collector 130a and the second current collector 130b. The separating membrane 120 can be coupled to the frame 110 in various ways. In the example of FIG. 1, a peripheral portion of the separating membrane 120 are coupled to the frame 110. The positively charged hydrogen ion moves from the first liquid electrode to the second liquid electrode at a time of discharge, and moves from the second liquid electrode to the first liquid electrode at a time of charge.

The separating membrane 120 may include perfluorinated ionomers, partially fluorinated polymers, and non-fluorinated hydrocarbons. The separating membrane 120 may be made of Nafion®, Flemion®, NEOSEPTAF® or Gore Select®, or include the same.

The separating membrane 120 is used to prevent the first liquid electrode and the second liquid electrode from mixing. However, a crossover phenomenon where vanadium ions and water, included in the first liquid electrode and the second liquid electrode, pass through the separating membrane 120 may occur at a time of charge or discharge. The crossover phenomenon causes an imbalance between the amount of the first liquid electrode and the amount of the second liquid electrode in the first electrode reservoir 111a and the second electrode reservoir 111b, and adversely affects the performance and lifespan of a battery. As compared with a battery such as a redox flow battery with external liquid electrode tanks and pumps, a battery according to implementations of the present disclosure can suffer from performance and lifespan that are adversely affected by even a slight imbalance. This is because a battery according to implementations of the present disclosure implements a small amount of the liquid electrodes only in the two half-cells of the battery without external tanks or pumps.

To mitigate the imbalance of electrolytes in the first electrode reservoir 111a and the second electrode reservoir 111b caused by such crossover, the frame 110 includes an inter-electrode communication part 112 that allows the first electrode reservoir 111a and the second electrode reservoir 111b to be in fluidic communication with each other. The inter-electrode communication part 112 helps to resolve an imbalance caused by the crossover phenomenon. The first liquid electrode or the second liquid electrode, which has an increased volume, moves to the first liquid electrode or the second liquid electrode, which has a deceased volume, through the inter-electrode communication part 112.

In some implementations, the inter-electrode communication part 112 can be formed in the frame 110. For example, one portion of the inter-electrode communication part 112 is formed into a channel along at least a portion of the frame 110 in the in-plane direction, and another portion is formed into a hole that passes through the frame 110 in the out-of-plane direction. The first liquid electrode and/or the second liquid electrode can therefore flow between the first electrode reservoir 111a and the second electrode reservoir 111b via the inter-electrode communication part 112 of the frame 110.

As discussed above, the first liquid electrode and the second liquid electrode are separated by the separating membrane 120, which is designed to prevent mixing of the two liquid electrodes and minimize crossover therebetween. Mixing of the two electrodes can cause risk of an electrical short circuit in the battery and risk of reducing battery efficiency. Therefore, it may seem counterintuitive to implement the inter-electrode communication part 112 which enables fluid communication directly between the first electrode reservoir 111a and the second electrode reservoir 111b. However, according to implementations of the present disclosure, by appropriately configuring the inter-electrode communication part 112, the risks of mixing the two electrodes can be safely avoided while still providing the benefits of balancing the amounts of the two liquid electrodes in the first electrode reservoir 111a and the second electrode reservoir 111b. Further details of the inter-electrode communication part 112 are described hereafter with reference to FIGS. 6 to 11.

The first current collector 130a is disposed at one side of the frame 110 (e.g., the side of the frame accommodating the first electrode reservoir 111a), and along with the frame 110 and the separating membrane 120, forms the first electrode reservoir 111a. The first current collector 130a is spaced from the second current collector 130b and disposed in parallel with the second current collector 130b. The first current collector 130a closely contacts the first gasket 160a disposed in the frame 110. The first current collector 130a in contact with the first insulator 170a does not directly contact the first liquid electrode or the second liquid electrode, which flows through the inter-electrode communication part 112. The first current collector 130a electrically connects with the first liquid electrode, and at a time of charge and discharge, electrons move such that currents flow.

The implementations described above pertain to a single battery in which the first electrode reservoir 111a and the second electrode reservoir 111b form two half-cells that are separated by the separating membrane 120, and the inter-electrode communication part 112 provides fluidic communication between the two half-cells. In some implementations, a plurality of such batteries can be inter-connected to form a module with a plurality of frames 110, a plurality of first current collectors 130a and a plurality of second current collectors 130b, as illustrated in the example FIG. 5, where the plurality of first current collectors 130a is electrically connected to each other by a busbar to connect the plurality of batteries in parallel.

In the example of FIG. 5, the first current collector 130a includes a first metal current collector 131a that is made of metal and electrically connected to a busbar, and a first carbon current collector 132a that is disposed between the first metal current collector 131a and the frame 110.

The first carbon current collector 132a is made of a material such as graphite, carbon, carbon plastics and the like and has high electrical conductivity and acid resistance. The first carbon current collector 132a is disposed between the first liquid electrode and the first metal current collector 131a and allows electrons to move between the first liquid electrode and the first metal current collector 131a, while preventing the oxidation of the first metal current collector 131a. The first carbon current collector 132a is formed into a rectangular plate or formed in a way that the first carbon current collector 132a is applied onto the first metal current collector 131a.

The first metal current collector 131a is made of metal exhibiting high electrical conductivity, e.g., copper or aluminum. The first metal current collector 131a is formed into a rectangular plate while a portion of the first metal current collector 131a protrudes and connects to the busbar.

The first metal current collector 131a may be formed into a thin film of ductility or a plate of rigidity. When the plurality of batteries forms a module as illustrated in the example of FIG. 5, a portion the first metal current collector 131a can be formed into a thin film of ductility and the other portion of the first metal current collector 131a can be formed into a plate of rigidity.

The first carbon current collector 132a is disposed on one surface of the first metal current collector 131a. When the plurality of batteries forms a module as illustrated in the example of FIG. 5, the first carbon current collector 132a can be respectively disposed on both surfaces of the first metal current collector 131a.

The second current collector 130b is disposed at the other side of the frame 110 (e.g., the other side of the frame accommodating the second electrode reservoir 111b), and along with the frame 110 and the separating membrane 120, forms the second electrode reservoir 111b. The second current collector 130b is spaced from the first current collector 130a and disposed in parallel with the first current collector 130a. The second current collector 130b closely contacts the second gasket 160b disposed in the frame 110. The second current collector 130b in contact with the second insulator 170b does not directly contact the first liquid electrode or the second liquid electrode, which flows through the inter-electrode communication part 112. The second current collector 130b electrically connects with the second liquid electrode, and at a time of charge and discharge, electrons move such that currents flow.

When a plurality of batteries forms a module with a plurality of frames 110, a plurality of first current collectors 130*a* and a plurality of second current collectors 130*b*, as illustrated in the example of FIG. 5, the plurality of second current collectors 130*b* can be electrically connected to each other by a busbar to connect the plurality of batteries in parallel.

The second current collector 130*b* includes a second metal current collector 131*b* that is made of metal and electrically connected to a busbar, and a second carbon current collector 132*b* that is disposed between the second metal current collector 131*b* and the frame 110.

The second carbon current collector 132*b* is made of a material such as graphite, carbon, carbon plastics and the like and has high electrical conductivity and acid resistance. The second carbon current collector 132*b* is disposed between the second liquid electrode and the second metal current collector 131*b* and allows electrons to move between the second liquid electrode and the second metal current collector 131*b*, while preventing the oxidation of the second metal current collector 131*b*. The second carbon current collector 132*b* is formed into a rectangular plate or formed in a way that the second carbon current collector 132*b* is applied onto the second metal current collector 131*b*.

The second metal current collector 131*b* is made of metal exhibiting high electrical conductivity, e.g., copper or aluminum. The second metal current collector 131*b* is formed into a rectangular plate while a portion of the second metal current collector 131*b* protrudes and connects to the busbar.

The second metal current collector 131*b* may be formed into a thin film of ductility or a plate of rigidity. When the plurality of batteries forms a module as illustrated in the example of FIG. 5, a portion of the second metal current collector 131*b* can be formed into a thin film of ductility and the other portion of the second metal current collector 131*b* can be formed into a plate of rigidity.

The second carbon current collector 132*b* is disposed on one surface of the second metal current collector 131*b*. When the plurality of batteries forms a module as illustrated in the example of FIG. 5, the second carbon current collector 132*b* can be respectively disposed on both surfaces of the second metal current collector 131*b*.

The battery of one implementation may further include a first gasket 160*a* sealing between the first current collector 130*a* and the frame 110, and a second gasket 160*b* sealing between the second current collector 130*b* and the frame 110.

The first gasket 160*a* and the second gasket 160*b* can be made of an elastic material, such as rubber or synthetic resin having elasticity. The first gasket 160*a* and the second gasket 160*b* can be formed into a rectangular strap.

The first solid electrode 150*a* is impregnated with the first liquid electrode and disposed in the first electrode reservoir 111*a*. The first solid electrode 150*a* is disposed in a way that the first solid electrode 150*a* is surrounded by the frame 110, the first current collector 130*a* and the separating membrane 120. The first solid electrode 150*a* includes carbon or a carbon-based material such as graphite felt, carbon fabric, carbon black, graphite powder or graphene. The first solid electrode 150*a* can be formed into a porous rectangular cuboid. In some implementations, the first solid electrode 150*a* has a thickness greater than that of the first electrode reservoir 111*a* in the out-of-plane direction. As such, the first solid electrode 150*a* can be pressed and accommodated in the first electrode reservoir 111*a*. The first solid electrode 150*a* contacts the first current collector 130*a* and the separating membrane 120 closely.

The second solid electrode 150*b* is impregnated with the second liquid electrode and disposed in the second electrode reservoir 111*b*. The second solid electrode 150*b* is disposed in a way that the second solid electrode 150*b* is surrounded by the frame 110, the second current collector 130*b* and the separating membrane 120. The second solid electrode 150*b* includes carbon or a carbon-based material such as graphite felt, carbon fabric, carbon black, graphite powder or graphene. The second solid electrode 150*b* can be formed into a porous rectangular cuboid. In some implementations, the second solid electrode 150*b* has a thickness greater than that of the second electrode reservoir 111*b* in the out-of-plane direction. As such, the second solid electrode 150*b* can be pressed and accommodated in the second electrode reservoir 111*b*. The second solid electrode 150*b* contacts the second current collector 130*b* and the separating membrane 120 closely.

The first insulator 170*a* is attached to the frame 110 to prevent the first liquid electrode or the second liquid electrode flowing through the inter-electrode communication part 112, in particular, the first liquid electrode or the second liquid electrode flowing through the channel portion of the inter-electrode communication part 112, from contacting the first current collector 130*a* directly, e.g., to cover the channel portion of the inter-electrode communication part 112. The first insulator 170*a* prevents the first liquid electrode or the second liquid electrode, flowing through the inter-electrode communication part 112, from connecting to the first current collector 130*a* electrically.

The first insulator 170*a* has a shape corresponding to a shape of the inter-electrode communication part 112. In one implementation, the first insulator 170*a* is formed into a rectangle that is elongated in one direction. The first insulator 170*a* is made of synthetic resin having low electrical conductivity and high acid resistance. The first insulator 170*a* can be formed into a film that is applied onto the first current collector 130*a*, in particular, the first carbon current collector 132*a*. The first insulator 170*a* is attached to a portion of the inter-electrode communication part 112 of the frame 110, which is formed into a channel and exposed, to prevent the exposure of the inter-electrode communication part 112. The first insulator 170*a* is stacked between the first current collector 130*a* and the frame 110.

The second insulator 170*b* is attached to the frame 110 to prevent the first liquid electrode or the second liquid electrode flowing through the inter-electrode communication part 112, in particular, the first liquid electrode or the second liquid electrode flowing through the channel portion of the inter-electrode communication part 112, from contacting the second current collector 130*b* directly, e.g., to cover the channel portion of the inter-electrode communication part 112. The second insulator 170*b* prevents the first liquid electrode or the second liquid electrode, flowing through the inter-electrode communication part 112, from connecting to the second current collector 130*b* electrically.

The second insulator 170*b* has a shape corresponding to a shape of the inter-electrode communication part 112. In one implementation, the second insulator 170*b* is formed into a rectangle that is elongated in one direction. The second insulator 170*b* is made of synthetic resin having low electrical conductivity and high acid resistance. The second insulator 170*b* can be formed into a film that is applied onto the second current collector 130*b*, in particular, the second carbon current collector 132*b*. The second insulator 170*b* is attached to a portion of the inter-electrode communication part 112 of the frame 110, which is formed into a channel and exposed, to prevent the exposure of the inter-electrode communication part 112. The second insulator 170b is stacked between the second current collector 130b and the frame 110.

The entire configuration of the above-described battery according to some implementations of the present disclosure is described as follows.

In some implementations, the separating membrane 120 is disposed at the center of the rectangular frame 110 having a predetermined thickness in the out-of-plane direction, the first current collector 130a is disposed at one side of the frame 110 in the out-of-plane direction (e.g., the side of the frame accommodating the first electrode reservoir 111a), and the second current collector 130b is disposed at the other side of the frame 110 in the out-of-plane direction (e.g., the other side of the frame accommodating the second electrode reservoir 111b), such that first electrode reservoir 111a and the second electrode reservoir 111b are formed. That is, the frame 110 is disposed between the first current collector 130a and the second current collector 130b, and the separating membrane 120 is disposed in the frame 110.

Referring to the example of FIG. 5, in some scenarios, the above-described configuration is alternated and repeated to form a module. For example, the first current collector 130a may be disposed among a plurality of frames 110 to which the separating membrane 120 is coupled, and the second current collector 130b may be disposed among the plurality of frames 110 to which the separating membrane 120 is coupled.

The first solid electrode 150a impregnated with the first liquid electrode is disposed in the first electrode reservoir 111a, and the second solid electrode 150b impregnated with the second liquid electrode is disposed in the second electrode reservoir 111b. The first gasket 160a and the first insulator 170a are disposed between the first current collector 130a and the frame, and the second gasket 160b and the second insulator 170b are disposed between the second current collector 130b and the frame.

The first current collector 130a includes the first carbon current collector 132a and the first metal current collector 131a, and the second current collector 130b includes the second carbon current collector 132b and the second metal current collector 131b. The first insulator 170a, the first carbon current collector 132a and the first metal current collector 131a are consecutively stacked on the inter-electrode communication part 112 at the first electrode reservoir 111a side (the side accommodating the first electrode reservoir 111a). The second insulator 170b, the second carbon current collector 132b and the second metal current collector 131b are stacked consecutively on the inter-electrode communication part 112 at the second electrode reservoir 111b side (the side accommodating the second electrode reservoir 111b).

Figure 6:
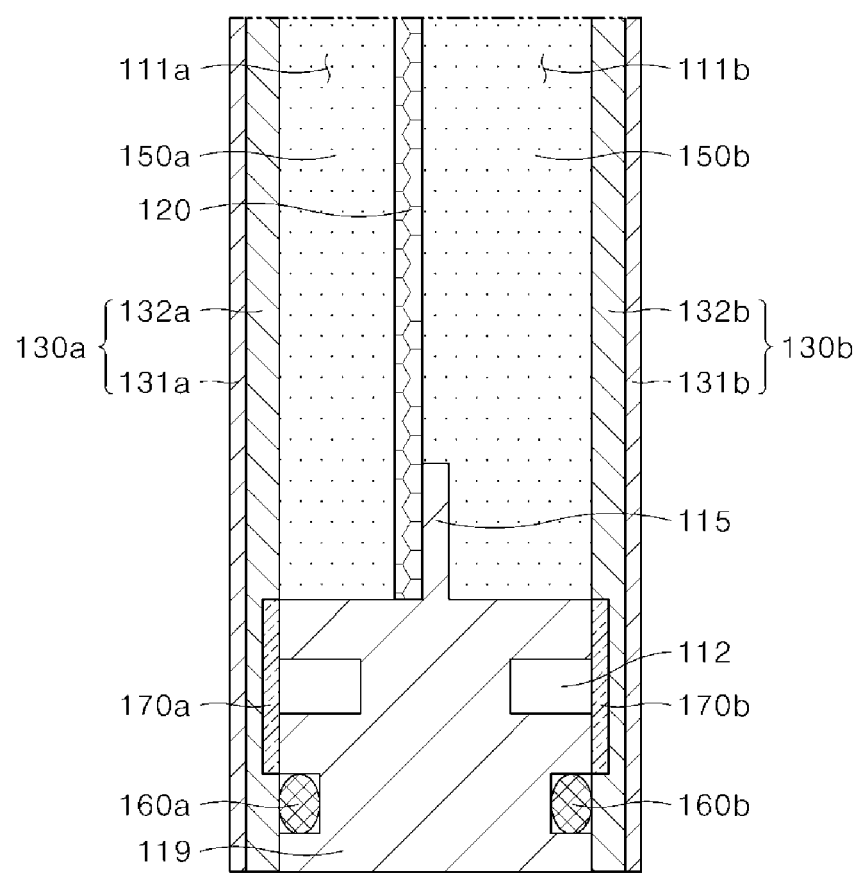
FIG. 6 is a view specifically showing a portion of the cross-sectional view of FIG. 4.
Figure 7:
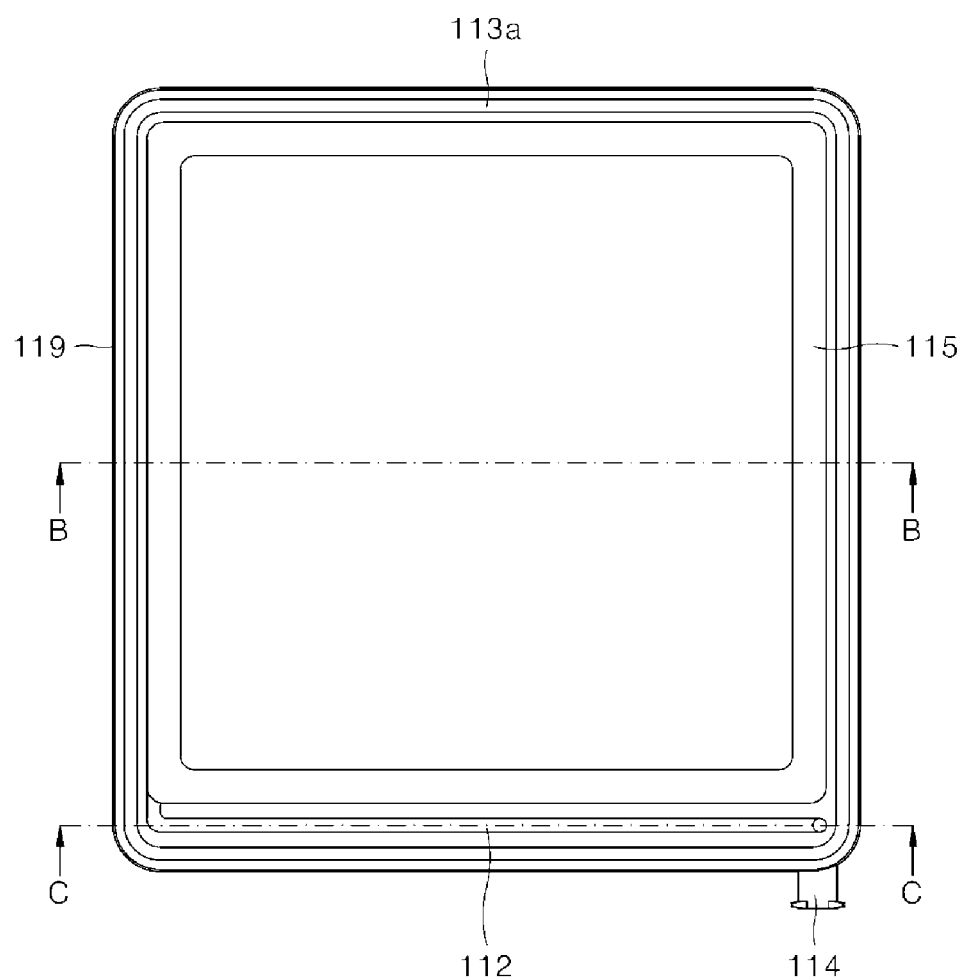
FIG. 7 is a front view showing a frame of the battery of one implementation.
Figure 8:
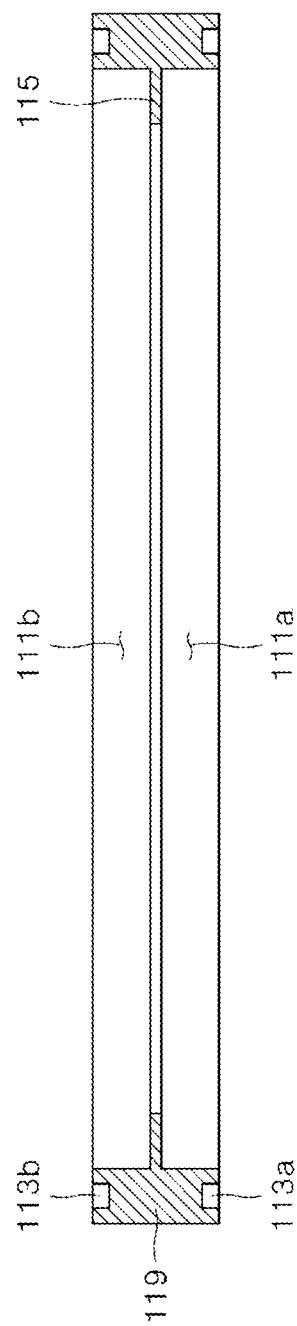
FIG. 8 is a cross-sectional view showing the frame along B-B in FIG. 7.
Figure 9:
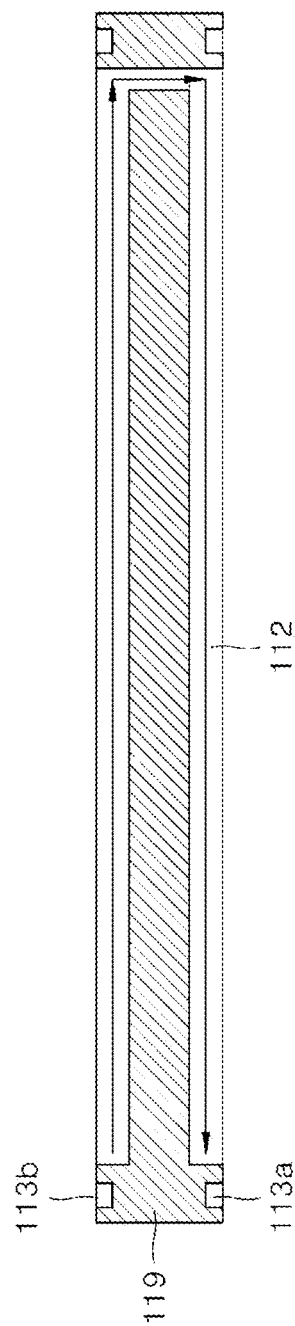
FIG. 9 is a cross-sectional view showing the frame along C-C in FIG. 7.
Figure 10:
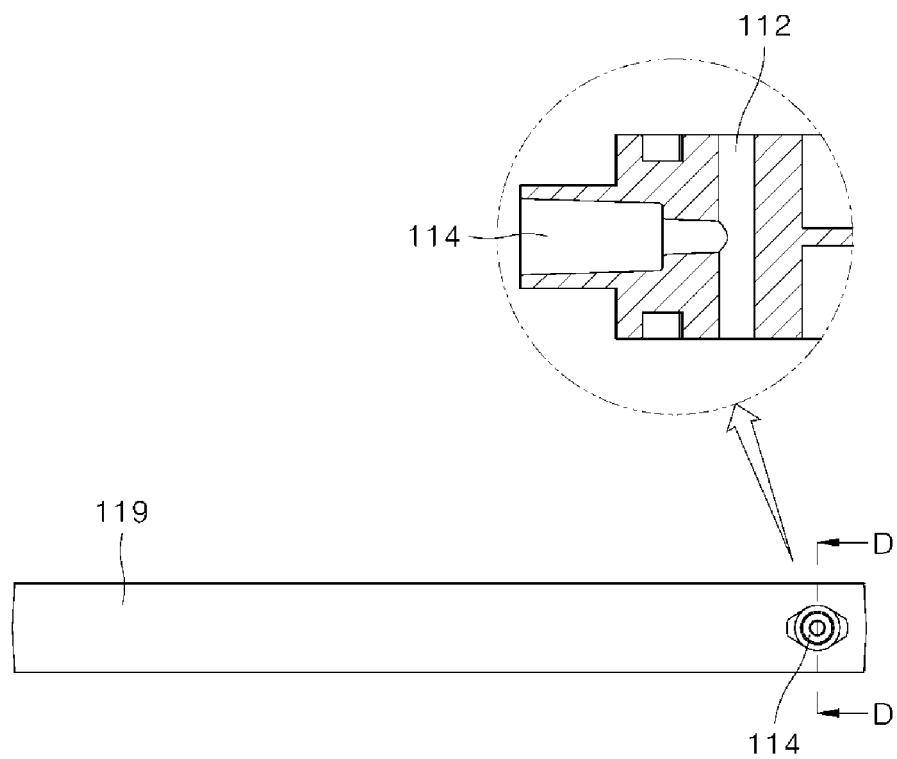
FIG. 10 is a bottom view and a cross-sectional view along D-D showing the frame of the battery of one implementation.
Figure 11:
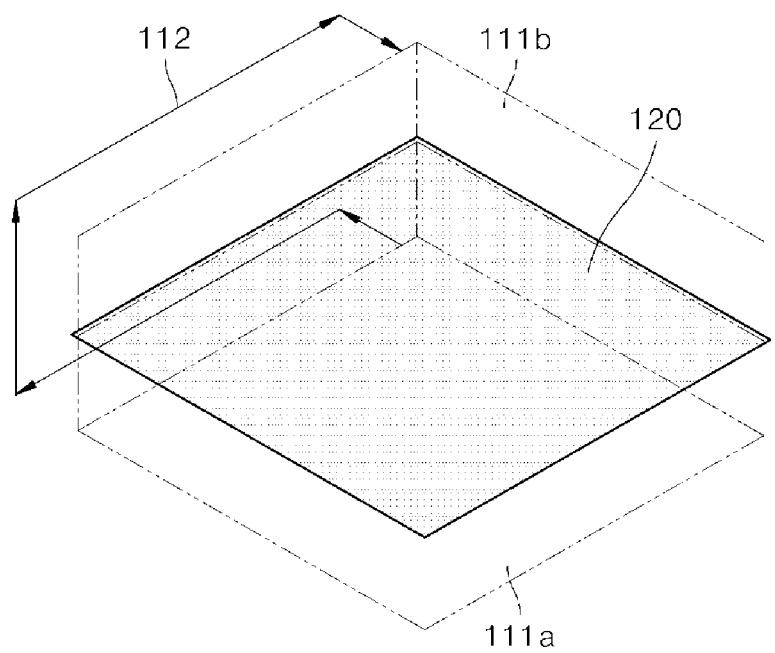
FIG. 11 is a view showing the flow of liquid electrodes through an inter-electrode communication part of the battery of one implementation.

FIG. 6 is a view specifically showing a portion of the cross-sectional view of FIG. 4, FIG. 7 is a front view showing a frame of the battery of one implementation, FIG. 8 is a cross-sectional view showing the frame along B-B in FIG. 7, FIG. 9 is a cross-sectional view showing the frame along C-C in FIG. 7, FIG. 10 is a bottom view and a cross-sectional view along D-D showing the frame of the battery of one implementation, and FIG. 11 is a view showing the flow of liquid electrodes through an inter-electrode communication part of the battery of one implementation.

The frame 110 of one implementation includes a frame body 119 which is formed into a rectangle having a hollow opening, a separating membrane support part 115 which protrudes inward from the hollow opening of the frame body 119 and is coupled to the separating membrane 120, a first gasket insertion part 113a which is formed into a channel on one side of the frame body 119 (e.g., the side of the frame body facing the first current collector 130a) and inserted into the first gasket 160a, a second gasket insertion part 113b which is formed into a channel on the other side of the frame body 119 (e.g., the other side of the frame body facing the second current collector 130b) and inserted into the second gasket 160b, an inter-electrode communication part 112 which is formed at the frame body 119, and a liquid electrode injection part 114 which protrudes outward from the frame body 119 and into which the first liquid electrode and the second liquid electrode can be injected.

The separating membrane support part 115 protrudes inward (in the central direction) from the frame body 119 in the in-plane direction and has a rectangle shape. The separating membrane 120 is coupled to the separating membrane support part 115 such that the separating membrane 120 can become taught. For example, in FIG. 1, a peripheral region of the separating membrane 120 is coupled to the separating membrane support part 115. The separating membrane support part 115 is configured with dimensions to support the separating membrane 120. The separating membrane support part 115 serves as a rib that reinforces the frame body 119 in the in-plane direction thereof and the like, and prevents the frame body 119 from being deformed in the in-plane direction and the like, despite the swell or shrink of the first liquid electrode or the second liquid electrode, or the generation of gas in the liquid electrodes or an external impact and the like.

In some implementations, a surface of the separating membrane support part 115 contacts the separating membrane 120 and is coupled to the separating membrane 120 completely to prevent the first liquid electrode or the second liquid electrode from leaking from between the separating membrane support part 115 and the separating membrane 120. An adhesive and/or a sealer can be interposed between the separating membrane support part 115 and the separating membrane 120. The separating membrane 120 can be welded to the separating membrane support part 115.

In some implementations, the first gasket insertion part 113a and the second gasket insertion part 113b are formed respectively along opposite side surfaces of the frame body 119 (e.g., the side of the frame body facing the first current collector 130a and the opposite side of the frame body facing the second current collector 130b). For example, the first gasket insertion part 113a and the second gasket insertion part 113b are formed into a rectangular channel along the frame body 119 and entirely formed into a rectangular strap. The first gasket insertion part 113a and the second gasket insertion part 113b are formed further outward than the inter-electrode communication part 112 in the in-plane direction, at the frame body 119.

In some implementations, the liquid electrode injection part 114 is formed at a portion of the perimeter of the frame body 119 and serves as an injection opening that allows the liquid electrodes to be injected into the first electrode reservoir 111a and the second electrode reservoir 111b, for example during assembly or maintenance of the battery. The liquid electrode injection part 114 can be closed after the liquid electrodes are injected. Depending on implementations, the liquid electrode injection part 114 can be removed as the liquid electrode injection part 114 is closed after the injection of the liquid electrodes.

Referring to FIG. 10, the liquid electrode injection part 114 is in fluidic communication with the inter-electrode communication part 112. Since the inter-electrode communication part 112 is in fluidic communication with the first electrode reservoir 111*a* and the second electrode reservoir 111*b*, the liquid electrode injection part 114 is in fluidic communication with the first electrode reservoir 111*a* and the second electrode reservoir 111*b* through the inter-electrode communication part 112.

The inter-electrode communication part 112 allows the first electrode reservoir 111*a* and the second electrode reservoir 111*b* to be in fluidic communication with each other. As discussed above, this can help resolve any imbalance between the amount of the first liquid electrode and the amount of the second liquid electrode caused by the crossover phenomenon occurring at a time of charge or discharge, such that the first liquid electrode or the second liquid electrode flows into the first electrode reservoir 111*a* or the second electrode reservoir 111*b* at a time of charge or discharge.

Preferably, the inter-electrode communication part 112 has a long thin shape. In some implementations, the inter-electrode communication part 112 has a volume to the degree that half of the difference between the amount of the first liquid electrode and the amount of the second liquid electrode, caused by the crossover phenomenon, flows, and can have a resistance value at a predetermined level or above.

The inter-electrode communication part 112 can be implemented in different shapes. For example, one portion of the inter-electrode communication part 112 is formed into a channel along at least a portion of the frame body 119, in the in-plane direction, and another portion is formed into a hole that passes through the frame body 119 in the out-of-plane direction. Referring to the example of FIG. 11, the inter-electrode communication part 112 bends at least twice or more times. The inter-electrode communication part 112 bends from the in-plane direction to the out-of-plane direction or from the out-of-plane direction to the in-plane direction. For example, in some implementations, the direction where the inter-electrode communication part 112 bends from the out-of-plane direction to the in-plane direction is orthogonal to the direction where the inter-electrode communication part 112 bends from the in-plane direction to the out-of-plane direction.

The inter-electrode communication part 112 is disposed in a direction where at least a portion of the inter-electrode communication part 112 penetrates an extended plane that is co-planar to the separating membrane 120. As such, the inter-electrode communication part 112 enables fluidic communication between the first electrode reservoir 111*a* or the second electrode reservoir 111*b* that are on opposite sides of the separating membrane 120. For example, at least a portion of the inter-electrode communication part 112 can be orthogonal to, and penetrates through, the extended plane that is co-planar to the separating membrane 120. Examples of this are shown on the left-hand region of FIG. 11 where a portion of inter-electrode communication part 112 is orthogonal to, and penetrates through, an extended plane that is co-planar to separating membrane 120, and similarly shown on the upper-right-hand region of FIG. 16. At least a portion of the inter-electrode communication part 112 is disposed in a direction (the in-plane-direction) parallel with the direction of the flat surface formed by the separating membrane 120. The inter-electrode communication part 112 is formed at a portion of the frame body 119 surrounding the first solid electrode 150*a* or the second solid electrode 150*b*, and disposed at a part of the perimeter of the first solid electrode 150*a* or the second solid electrode 150*b*. In some implementations, at least two portions of the inter-electrode communication part 112 are disposed side by side. For example, in FIG. 11, two portions of the inter-electrode communication part 112 are disposed along the same portion of the separating membrane 120 (e.g., parallel to each other) on opposite sides of the separating membrane 120.

In some implementations, the width of the cross section of the channel or hole of the inter-electrode communication part 112, in particular, the depth of the channel portion of the inter-electrode communication part 112, is less than half the thickness (the width in the out-of-plane direction) of the frame body 119. In some implementations, the width of the cross section of the channel or hole of the inter-electrode communication part 112, in particular, the depth of the channel portion of the inter-electrode communication part 112, is less than the thickness (the width in the out-of-plane direction) of the first electrode reservoir 111*a* or the second electrode reservoir 111*b*. In some implementations, the entire length of the inter-electrode communication part 112 is similar to or greater than the length of a longer side portion of the frame body 119. In some implementations, the length and the cross section of the inter-electrode communication part 112 are configured such that the inter-electrode communication part 112 becomes longer, as the cross section of the inter-electrode communication part 112 becomes smaller.

Referring to the examples of FIGS. 9 and 11, the inter-electrode communication part 112 in one implementation is formed along one side of the frame body 119 (e.g., the side of the frame body accommodating the first electrode reservoir 111*a*) in the in-plane direction thereof and then bends, and is formed in the out-of-plane direction of the frame body 119 and then bends again, such that the inter-electrode communication part 112 is formed and disposed along the opposite side of the frame body 119 (e.g., the opposite side of the frame body accommodating the second electrode reservoir 111*b*) in the in-plane direction thereof.

The inter-electrode communication part 112 is disposed further outward than the separating membrane support part 115 in the in-plane direction. The inter-electrode communication part 112 is disposed further inward than the first gasket insertion part 113*a* or the second gasket insertion part 113*b* in the in-plane direction. The channel portion of the inter-electrode communication part 112 is covered by the first insulator 170*a* and the second insulator 170*b* and is not exposed outward.

An example of the operation of the inter-electrode communication part 112 of the battery configured as described above, according to some implementations of the present disclosure, is described as follows.

At a time of charge or discharge, vanadium ions and water included in the first liquid electrode and the second liquid electrode pass through the separating membrane 120, and the amount of any one of the first liquid electrode or the second liquid electrode increases due to crossover, causing an imbalance in their amounts. To mitigate such imbalance, one liquid electrode, among the first liquid electrode and the second liquid electrode, having an increased amount moves to the other liquid electrode having a decreased amount, through the inter-electrode communication part 112. Since the inter-electrode communication part 112 has a long thin shape, the first liquid electrode and the second liquid electrode do not experience an electrical short circuit even though the liquid electrodes flow through the inter-electrode communication part 112.

Figure 12:
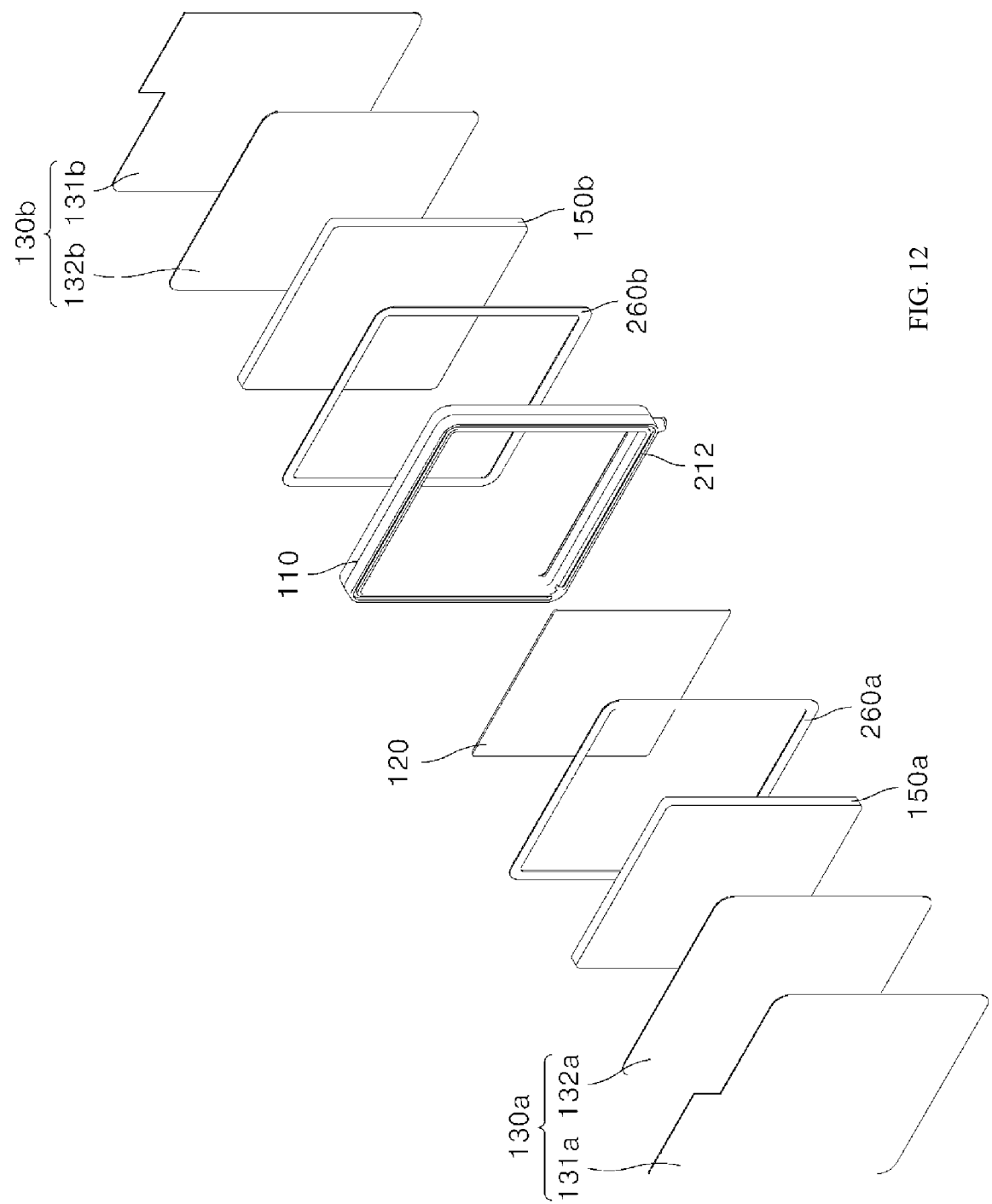
FIG. 12 is an exploded perspective view showing a battery of another implementation.
Figure 13:
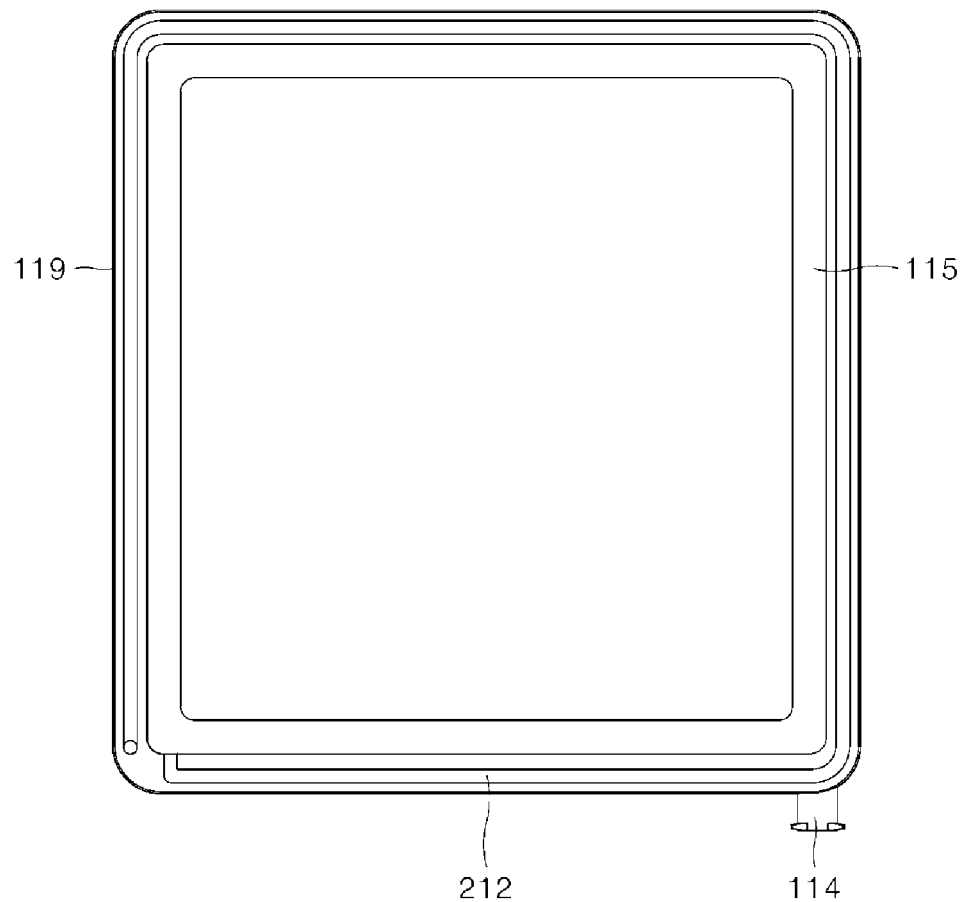
FIG. 13 is a front view showing a frame of the battery of another implementation.
Figure 14:
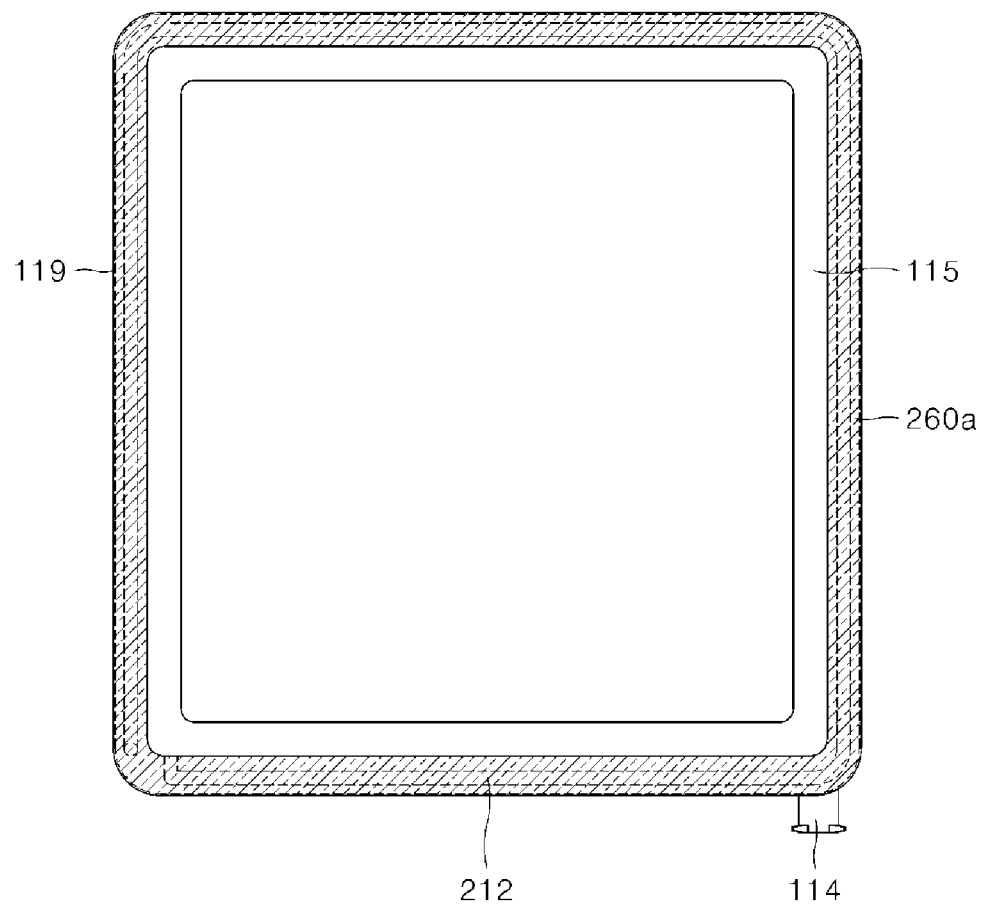
FIG. 14 is a front view showing the battery and an insulator in another implementation.
Figure 15:
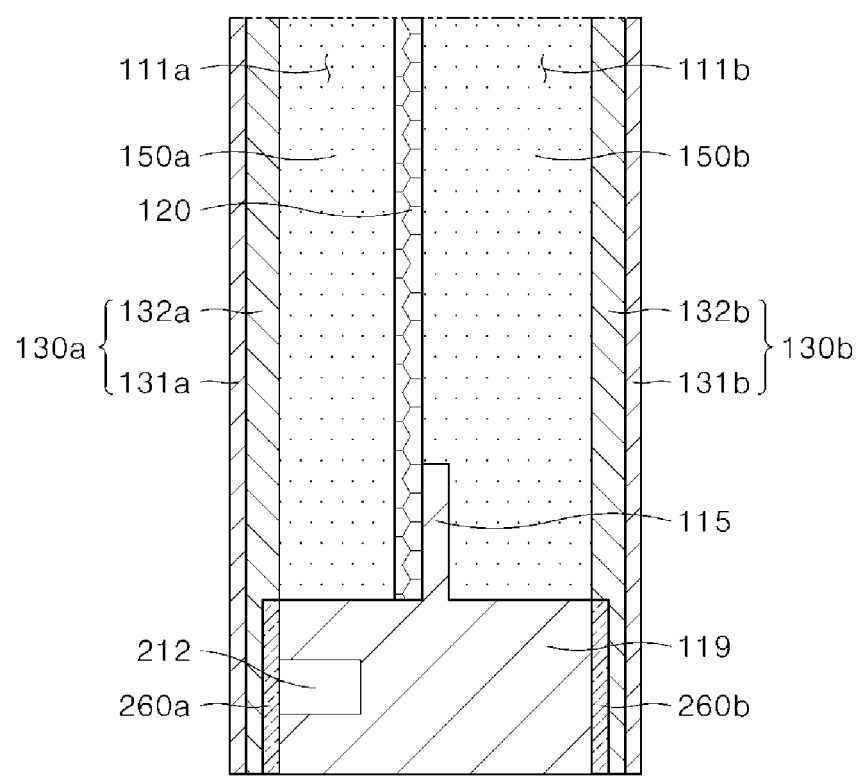
FIG. 15 is a cross-sectional view showing a portion of the battery of another implementation.
Figure 16:
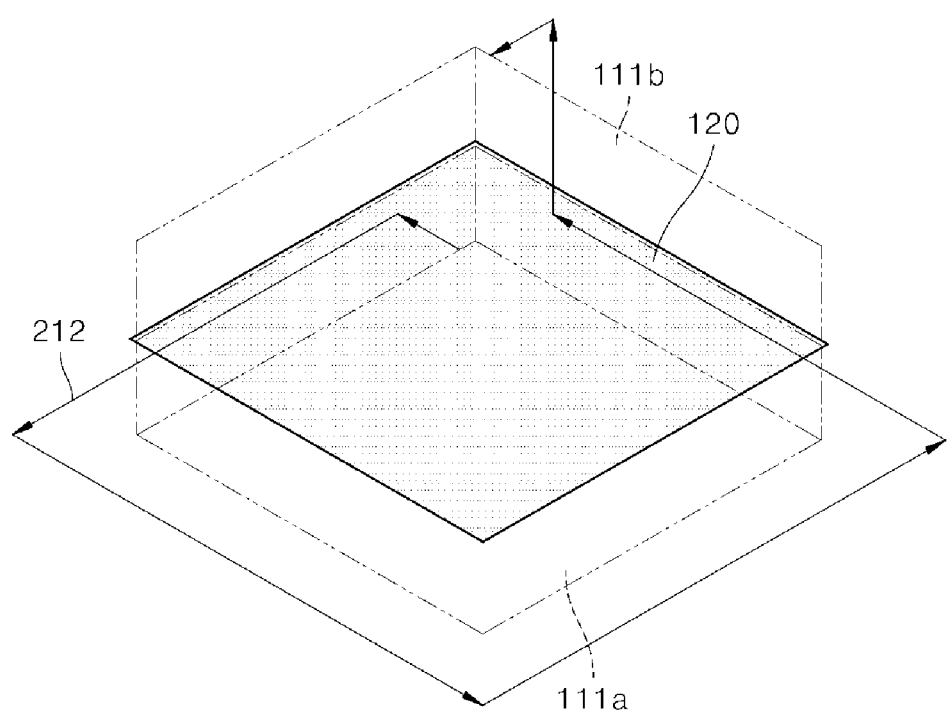
FIG. 16 is a view showing the flow of liquid electrodes through an inter-electrode communication part of the battery of another implementation.

FIG. 12 is an exploded perspective view showing a battery of another implementation, FIG. 13 is a front view showing a frame of the battery of another implementation, FIG. 14 is a front view showing the battery and an insulator in another implementation, FIG. 15 is a cross-sectional view showing a portion of the battery of another implementation, and FIG. 16 is a view showing the flow of liquid electrodes through an inter-electrode communication part of the battery of another implementation.

An inter-electrode communication part 212 of the battery of another implementation may be formed into a nearly rectangular shape along the frame body 119. For example, the inter-electrode communication part 212 can be disposed along the entire perimeter of the first solid electrode 150a or the second solid electrode 150b. In the example if FIG. 16, the inter-electrode communication part 212 bends along the frame body 119 in the in-plane direction three times to have a nearly rectangular shape, and then bends to the out-of-plane direction to pass through the frame body 119.

A first insulator 260a and a second insulator 260b of the battery of another implementation are formed into a rectangular strap, and cover the inter-electrode communication part 212. In one implementation, the first gasket 160a, the second gasket 160b, the first gasket insertion part 113a and the second gasket insertion part 113b are omitted, while the first insulator 270a and the second insulator 270b are formed into a rectangular strap and cover the channel portion of the inter-electrode communication part 212. The first insulator 260a and the second insulator 260b respectively seal between the first current collector 130a and the frame 110 and between the second current collector 130b and the frame 110. The first insulator 260a and the second insulator 260b respectively contact the first current collector 130a and the frame 110, and the second current collector 130b and the frame 110 completely, to prevent the first liquid electrode and the second liquid electrode from leaking outward.

FIGS. 17 to 21 show examples of various implementations of a frame of the battery in the present disclosure.

The frame 110 can further include a frame reinforcement part 116 that is disposed in the hollow opening portion of the frame body 119 and prevents the deformation of the frame body 119.

The frame reinforcement part 116 is formed to connect any one of the four peripheral sides and another of the four peripheral sides of the frame body 119 or connect any one angular point and another angular point of the frame body 119. In some implementations, the frame reinforcement part 116 connects two peripheral sides or two angular points by crossing the hollow opening portion of the rectangular frame body 119, to prevent the rectangular frame body 119 from being deformed into a rhombus or a circle.

Since the frame reinforcement part 116 is formed to connect at least two peripheral sides or at least two angular points of the frame body 119, the frame reinforcement part 116 can be disposed or formed at the separating membrane support part 115.

Figure 17:
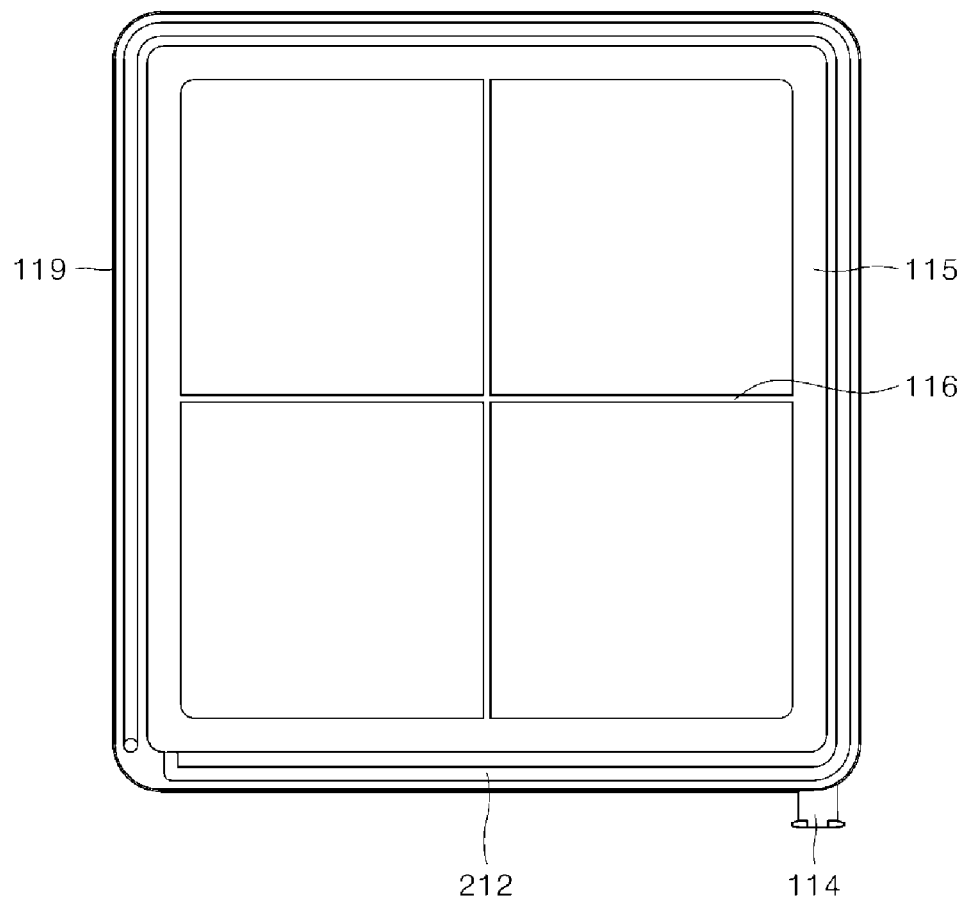
FIGS. 17 to 21 are views showing different implementations of the frame of the battery in the present disclosure.

In the example of FIG. 17, the frame reinforcement part 116 is formed at the separating membrane support part 115 to connect the frame body 119's two peripheral sides that face each other. In one implementation, the frame reinforcement part 116 is formed into a cross (+) shape to connect the center of any one peripheral side of the frame body 119 and the center of the opposite peripheral side of the frame body 119.

Figure 18:
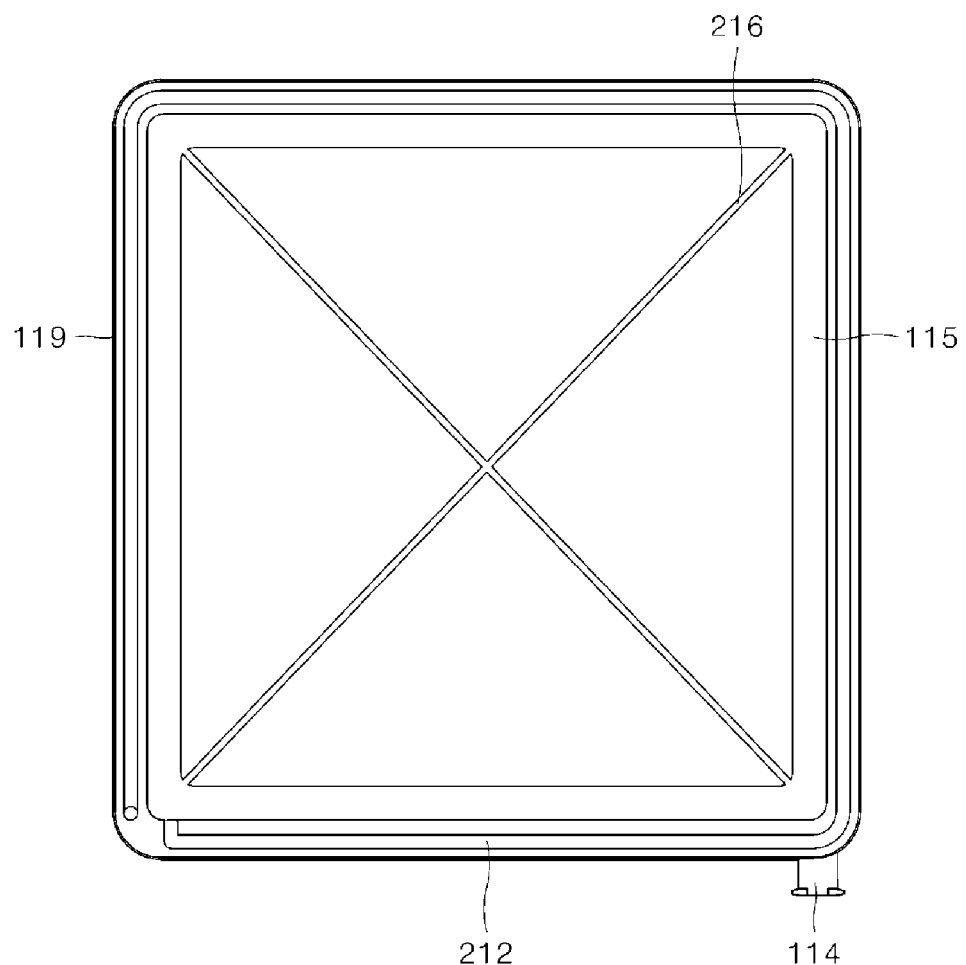

In the example of FIG. 18, a frame reinforcement part 216 is formed at the separating membrane support part 115 to connect the frame body 119's angular points that face each other. In one implementation, the frame reinforcement part 216 is formed into an X shape to connect two angular points facing each other.

Figure 19:
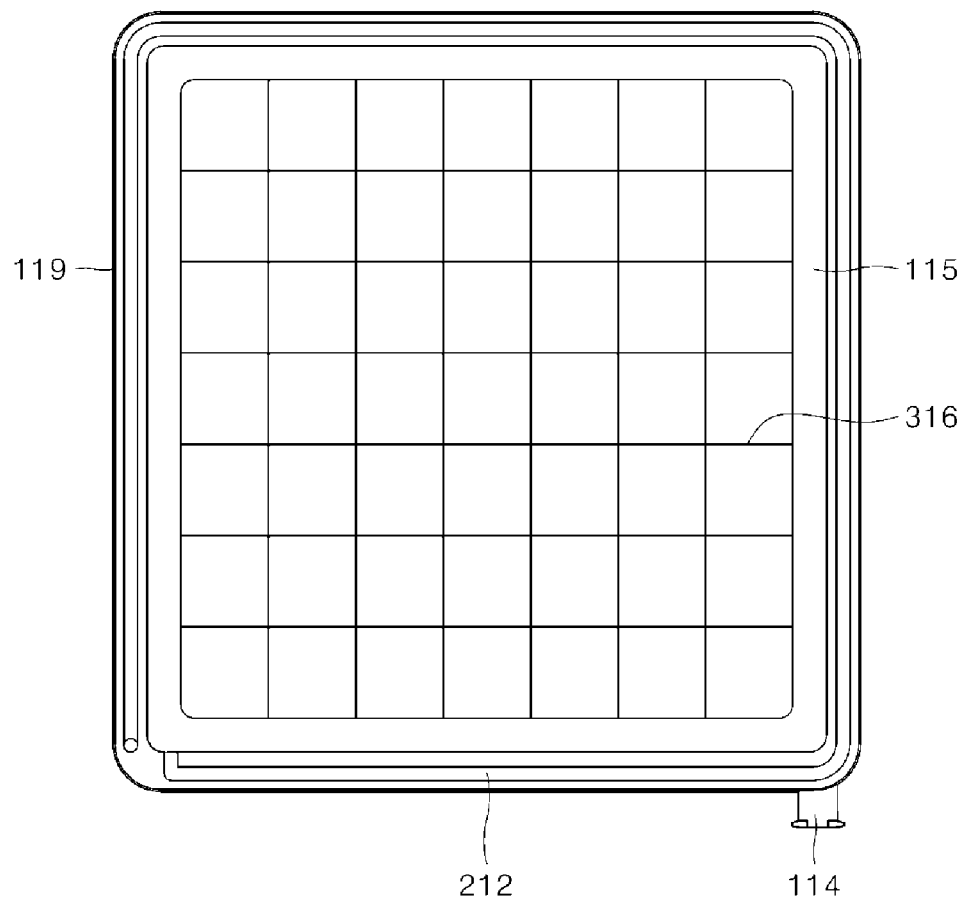

In the example of FIG. 19, the frame reinforcement part 316 is formed into a mesh shape and disposed at the separating membrane support part 115.

Figure 20:
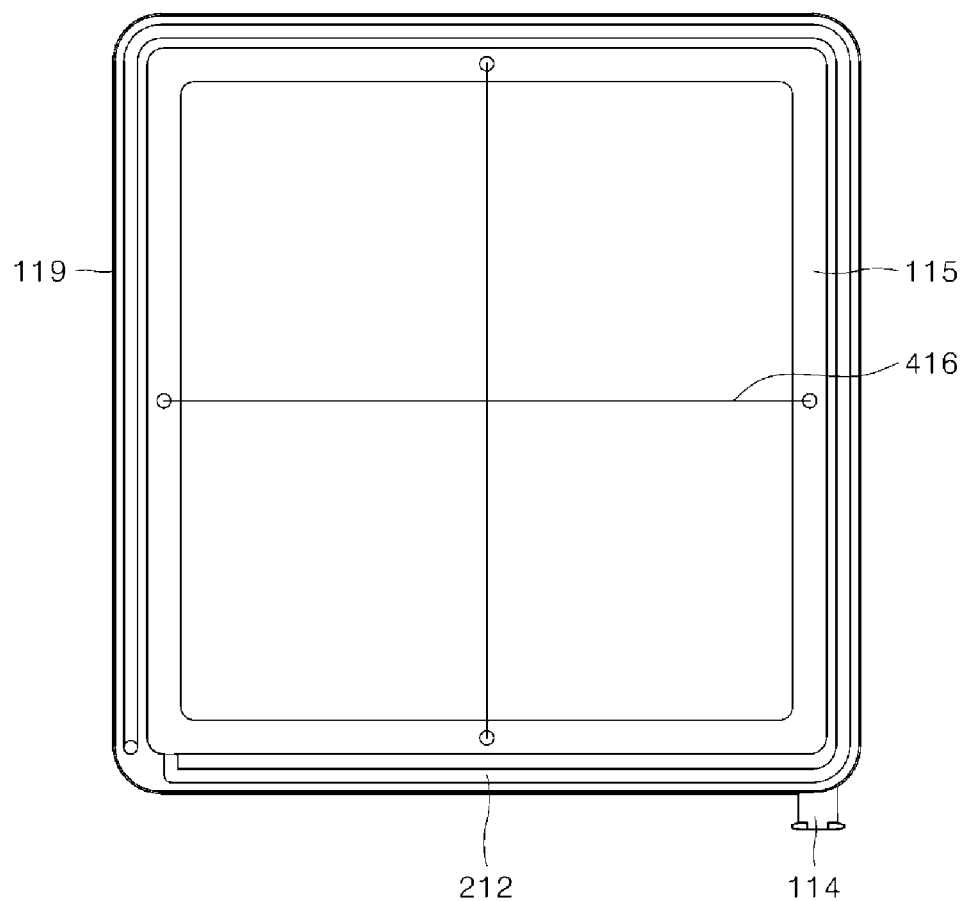

In the example of FIG. 20, the frame reinforcement part 416 is a wire connecting two peripheral sides that face each other, and connects to a hole formed at the separating membrane support part 115.

Figure 21:
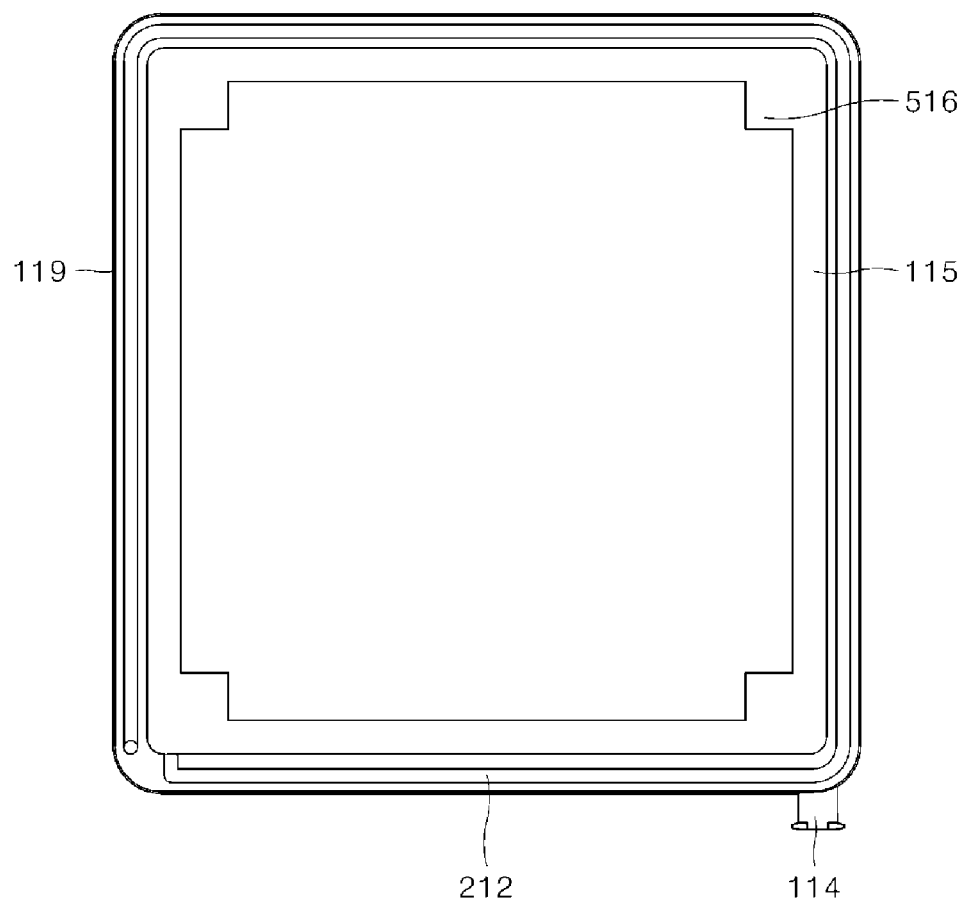

In the example of FIG. 21, the frame reinforcement part 516 is disposed at each of the angular points of the separating membrane support part 115 and connects adjacent two peripheral sides.

The implementations are described above with reference to a number of illustrative implementations thereof. However, implementations are not limited to the implementations and drawings set forth herein, and numerous other modifications and implementations can be drawn by one skilled in the art within the technical scope of the disclosure. Further, the modifications and implementations are not to be interpreted as departing from the technical scope and prediction of the present disclosure.

The invention claimed is:

1. A battery, comprising:
a first liquid electrode to undergo a first half reaction;
a second liquid electrode to undergo a second half reaction;
a hollow frame having a first electrode reservoir to store the first liquid electrode and a second electrode reservoir to store the second liquid electrode; and
a separating membrane coupled to the hollow frame and disposed between the first electrode reservoir and the second electrode reservoir,
wherein the hollow frame comprises an inter-electrode communication part, at least a portion of which passes through the hollow frame in an out-of-plane direction to allow mixing between at least part of the first liquid electrode stored in the first electrode reservoir and at least part of the second liquid electrode stored in the second electrode reservoir,
wherein the hollow frame comprises a separating membrane support part coupled to the separating membrane, and
wherein the inter-electrode communication part is disposed outside the separating membrane support part.

2. The battery of claim 1, wherein the hollow frame has a hollow rectangle shape with four side portions, and
a portion of the inter-electrode communication part is disposed along one side portion of the hollow frame.

3. The battery of claim 1, further comprising:
a first current collector contacting a first side of the hollow frame accommodating the first electrode reservoir and electrically connecting to the first liquid electrode; and
a first gasket sealing between the first current collector and the hollow frame,
wherein the hollow frame comprises a first gasket insertion part into which the first gasket is inserted, and
the inter-electrode communication part is disposed inside the first gasket insertion part.

4. The battery of claim 1, further comprising:
a first current collector contacting a first side of the hollow frame accommodating the first electrode reservoir and electrically connecting to the first liquid electrode; and
a first insulator attached to the hollow frame to prevent the first liquid electrode or the second liquid electrode that flows through the inter-electrode communication part from contacting the first current collector.

5. The battery of claim 4, wherein the first insulator seals between the first current collector and the hollow frame.

6. The battery of claim 4, wherein the first insulator is stacked between the first current collector and the hollow frame.

7. The battery of claim 4, wherein the first insulator is a film applied onto the first current collector.

8. The battery of claim 1, wherein the inter-electrode communication part includes at least two bent portions.

9. The battery of claim 8, wherein the inter-electrode communication part bends from an in-plane direction to an out-of-plane direction or from an out-of-plane direction to an in-plane direction.

10. The battery of claim 1, wherein the inter-electrode communication part passes through a flat surface formed by the separating membrane.

11. The battery of claim 10, wherein the inter-electrode communication part is orthogonal to the flat surface formed by the separating membrane.

12. The battery of claim 1, wherein a portion of the inter-electrode communication part is disposed in a direction parallel with a direction of a flat surface formed by the separating membrane.

13. The battery of claim 1, further comprising:
a first solid electrode disposed in the first electrode reservoir and configured to be impregnated with the first liquid electrode; and
a second solid electrode disposed in the second electrode reservoir and configured to be impregnated with the second liquid electrode,
wherein the inter-electrode communication part is disposed at a part of a perimeter of the first solid electrode or the second solid electrode.

14. The battery of claim 1, further comprising:
a first solid electrode disposed in the first electrode reservoir and configured to be impregnated with the first liquid electrode; and
a second solid electrode disposed in the second electrode reservoir and configured to be impregnated with the second liquid electrode,
wherein the inter-electrode communication part is disposed around an entire perimeter of the first solid electrode or the second solid electrode.

15. The battery of claim 1, wherein at least two parts of the inter-electrode communication part are disposed side by side.

16. The battery of claim 1, wherein the battery further comprises a liquid electrode injection part for injecting the first liquid electrode and the second liquid electrode into the first electrode reservoir and the second electrode reservoir, and
the liquid electrode injection part is in fluidic communication with the inter-electrode communication part.

17. The battery of claim 16, wherein the first liquid electrode and the second liquid electrode are injected into the first electrode reservoir and the second electrode reservoir though the liquid electrode injection part.

18. The battery of claim 1, wherein a width of a cross section of the inter-electrode communication part is less than half of a thickness of the hollow frame.

19. The battery of claim 1, wherein the hollow frame has a hollow rectangle shape with four side portions, and
an entire length of the inter-electrode communication part is greater than a length of a longer side portion of the frame.

20. A battery, comprising:
a first liquid electrode to undergo a first half reaction;
a second liquid electrode to undergo a second half reaction;
a separating membrane disposed between the first liquid electrode and the second liquid electrode; and
a frame to support the separating membrane,
wherein the frame comprises an inter-electrode communication part, at least a portion of which passes through the frame in an out-of-plane direction to allow mixing between at least part of the first liquid electrode and at least part of the second liquid electrode,
wherein the frame comprises a separating membrane support part coupled to the separating membrane, and
wherein the inter-electrode communication part is disposed outside the separating membrane support part.

21. A battery, comprising:
a first current collector;
a second current collector spaced apart from the first current collector;
a separating membrane disposed between the first current collector and the second current collector;
a first liquid electrode disposed between the first current collector and the separating membrane to undergo a first half reaction, and connects to the first current collector electrically;
a second liquid electrode disposed between the second current collector and the separating membrane to undergo a second half reaction, and connects to the second current collector electrically; and
a hollow frame disposed between the first current collector and the second current collector,
wherein the hollow frame comprises an inter-electrode communication part through which at least part of the first liquid electrode mixes with at least part of the second liquid electrode.

22. A battery, comprising:
a first current collector;
a second current collector spaced apart from the first current collector;
a separating membrane disposed between the first current collector and the second current collector; and
a frame disposed between the first current collector and the second current collector, forming a first electrode reservoir between the first current collector and the separating membrane, and forming a second electrode reservoir between the second current collector and the separating membrane,
wherein the frame comprises an inter-electrode communication part allowing mixing between at least part of a first liquid electrode stored in the first electrode reservoir and at least part of a second liquid electrode stored in the second electrode reservoir.

* * * * *